United States Patent [19]
Suciu

[11] Patent Number: 6,076,087
[45] Date of Patent: Jun. 13, 2000

[54] QUERY EVALUATION ON DISTRIBUTED SEMI-STRUCTURED DATA

[75] Inventor: Dan Suciu, Mountainside, N.J.

[73] Assignee: AT&T Corp, New York, N.Y.

[21] Appl. No.: 09/059,640

[22] Filed: Apr. 13, 1998

Related U.S. Application Data

[60] Provisional application No. 60/066,471, Nov. 26, 1997.

[51] Int. Cl.[7] .................................................. G06F 17/30
[52] U.S. Cl. .................................. 707/3; 707/2; 707/100; 707/5
[58] Field of Search .................................. 707/2, 3, 100, 707/5, 4

[56] References Cited

U.S. PATENT DOCUMENTS

| | | | |
|---|---|---|---|
| 4,769,772 | 9/1988 | Dwyer ........................................ | 364/300 |
| 5,185,857 | 2/1993 | Rozmanith et al. ....................... | 395/148 |
| 5,590,319 | 12/1996 | Cohen et al. .............................. | 707/4 |
| 5,634,053 | 5/1997 | Noble et al. ............................... | 707/4 |
| 5,675,791 | 10/1997 | Bhide et al. ............................... | 707/205 |
| 5,694,593 | 12/1997 | Baclawski .................................. | 707/5 |
| 5,742,806 | 4/1998 | Reiner et al. .............................. | 707/3 |
| 5,745,746 | 4/1998 | Jhingran et al. ........................... | 707/2 |
| 5,758,335 | 5/1998 | Gray .......................................... | 707/2 |
| 5,806,059 | 9/1998 | Tsuchida et al. .......................... | 707/2 |
| 5,819,255 | 10/1998 | Celis et al. ................................ | 707/2 |
| 5,960,194 | 9/1999 | Choy et al. ................................ | 707/102 |

Primary Examiner—Jean R. Homere

[57] ABSTRACT

The invention provides a system and method for evaluating a query on a distributed database across multiple sites. Database portion contained within each site is processed by a respective terminal. A client terminal is a terminal that distributes and collects information for evaluating the query. Each of the terminals receives the query and performs evaluation of the query on the respective distributed portion of the database. The terminals generate an accessibility graph based on the query evaluation of the respective distributive portion of the database and transmit the accessibility graphs to the client terminal. The client terminal receives all the accessibility graphs from each of the terminals and constructs an accessibility graph for the complete distributed database. The client terminal then traces through the accessibility graph for the distributed database and determines which parts of each of the distributed portions contribute to the query result. The client terminal transmits to each of the terminals information identifying the respective parts that contribute to the query result. The terminals returns the parts of the respective portions of the distributed database to the client terminal for construction of the query result.

24 Claims, 29 Drawing Sheets

400

400

400

406

X = BIBLIOGRAPHY 361

X = TITLE 362

X = TITLE 363

400

6,076,087

QUERY EVALUATION ON DISTRIBUTED SEMI-STRUCTURED DATA

This non-provisional application claims the benefit of U.S. Provisional Application No. 60/066471 entitled "Distributed Query Evaluation on Semi-Structured Data" filed on Nov. 26, 1997. The applicant of the provisional application is Dan Suciu (Attorney Docket No. Suciu-8).

The provisional application is hereby incorporated by reference including all the references listed in the bibliography.

BACKGROUND OF THE INVENTION

1. Field of Invention

This invention relates to query evaluation on distributed semi-structured data.

2. Description of Related Art

Databases that are distributed across networks are difficult and costly to query because a single terminal does not have immediate access to all portions of the database. This problem is especially aggravated when the database is unstructured or semi-structured because few assumptions may be made regarding the structured database. Thus, querying such a distributed database requires undesirably voluminous transfers of data and/or processing queries serially following the relationships of data as they are encountered. The difficulty is further aggravated by increased complexity of the queries themselves. Accordingly, there is a need for efficient techniques to process queries of unstructured or semi-structured distributed databases.

SUMMARY OF THE INVENTION

The invention provides a system and method for evaluating a query on a distributed database across multiple sites. The multiple sites may be connected by a network and a database portion contained within each site may be processed by a site terminal of each site. A client terminal (which may be a terminal of one of the sites) is a terminal that distributes and collects information to the site terminals for evaluating the query. Each of the terminals receives the query and performs evaluation of the query on the respective distributed portion of the database. The site terminals generate an accessibility graph based on the query evaluation of the respective distributed portion and transmit the accessibility graphs to the client terminal. The client terminal receives the accessibility graphs from all the terminals and constructs an accessibility graph for the complete distributed database. The client terminal then traces through the accessibility graph for the distributed database and determines which parts of each of the distributed portions contribute to the query result and transmits to each of the terminals information identifying the respective parts. The terminals return the identified parts to the client terminal for construction of the query result.

For selection queries, the invention provides a system and method for distributively evaluating a partial result based on the Where clauses of the selection query. Each of the respective terminals generate an accessibility graph that also includes local existence nodes which indicate the existence of a particular pattern match. The client terminal receives the accessibility graphs from the terminals and generates global existence nodes corresponding to the local existence nodes which indicate whether the discovered matches may contribute to the query result.

The above system and method evaluates a query for distributed databases in an efficient manner because the total number of communication steps among the terminals is independent of the content of the distributed database or the query and the total amount of data transferred among the terminals depends only on the total number of interrelationships of the database portions among the terminals and the size of the evaluation result.

BRIEF DESCRIPTION OF THE DRAWINGS

The invention is described in detail with reference to the following drawings wherein like numerals represent like elements, and wherein.

DETAILED DESCRIPTION OF PREFERRED EMBODIMENTS

Figure 1:
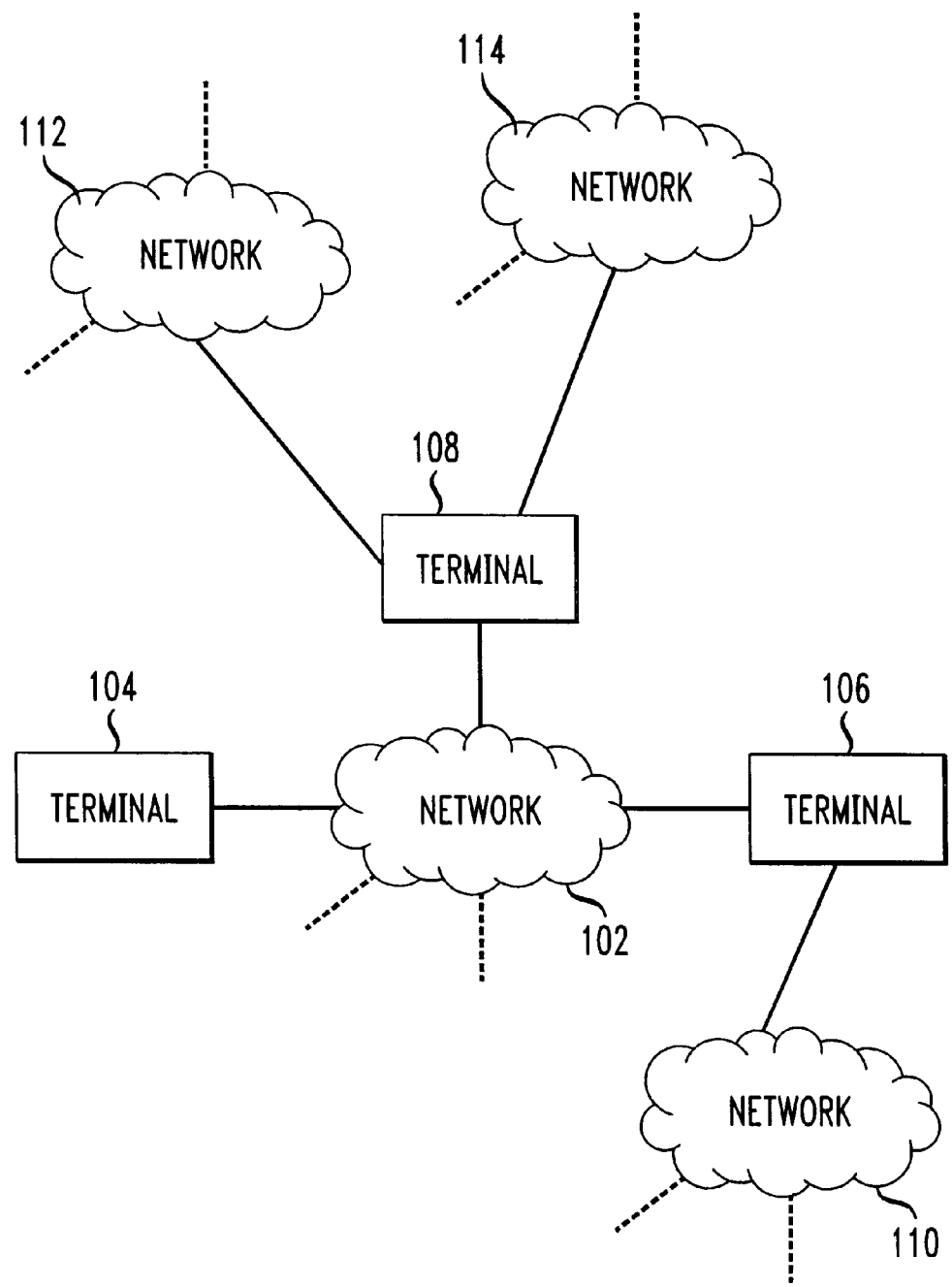
FIG. 1 shows a diagram of a network example.

FIG. 1 shows terminals 104, 106 and 108 connected among networks 102, 110, 112 and 114. The networks 102, 110, 112 and 114 may represent wide area networks such as the Internet or intra-networks (or intranets) which are networks internal to an organization such as a corporation. When information contained within the networks are desired, any one of the terminals may access the networks through appropriate network connections and begin searching for the desired information.

The information contained in the networks is stored in databases associated with each of the terminals 104, 106 and 108. This information may be viewed as a distributed database because the information is located in many different locations and no one terminal 104, 106 or 108 can immediately access all portions of the information. Queries may be conducted on the distributed database if the information in the distributed database are related enough to be modeled by an edge-labeled tree, for example. However, because the information is not immediately accessible by any one of the terminals 104, 106 or 108, evaluating queries for the distributed database necessitates data transfers among the terminals 104, 106 and 108 in order to obtain a query result.

The preferred embodiments of this invention provides a method and apparatus for efficiently evaluating queries for databases that are distributed across logically distant terminals. An evaluation is efficient for a distributed database if and only if: (1) the total number of communications steps among the terminals is independent of the content of the distributed database or the query; and (2) the total amount of data transferred among the terminals depends only on the total number of interrelationships of the database portions among the terminals and the size of the evaluation result. The above definition of efficiency is assumed for the remaining discussion below.

Figure 2:
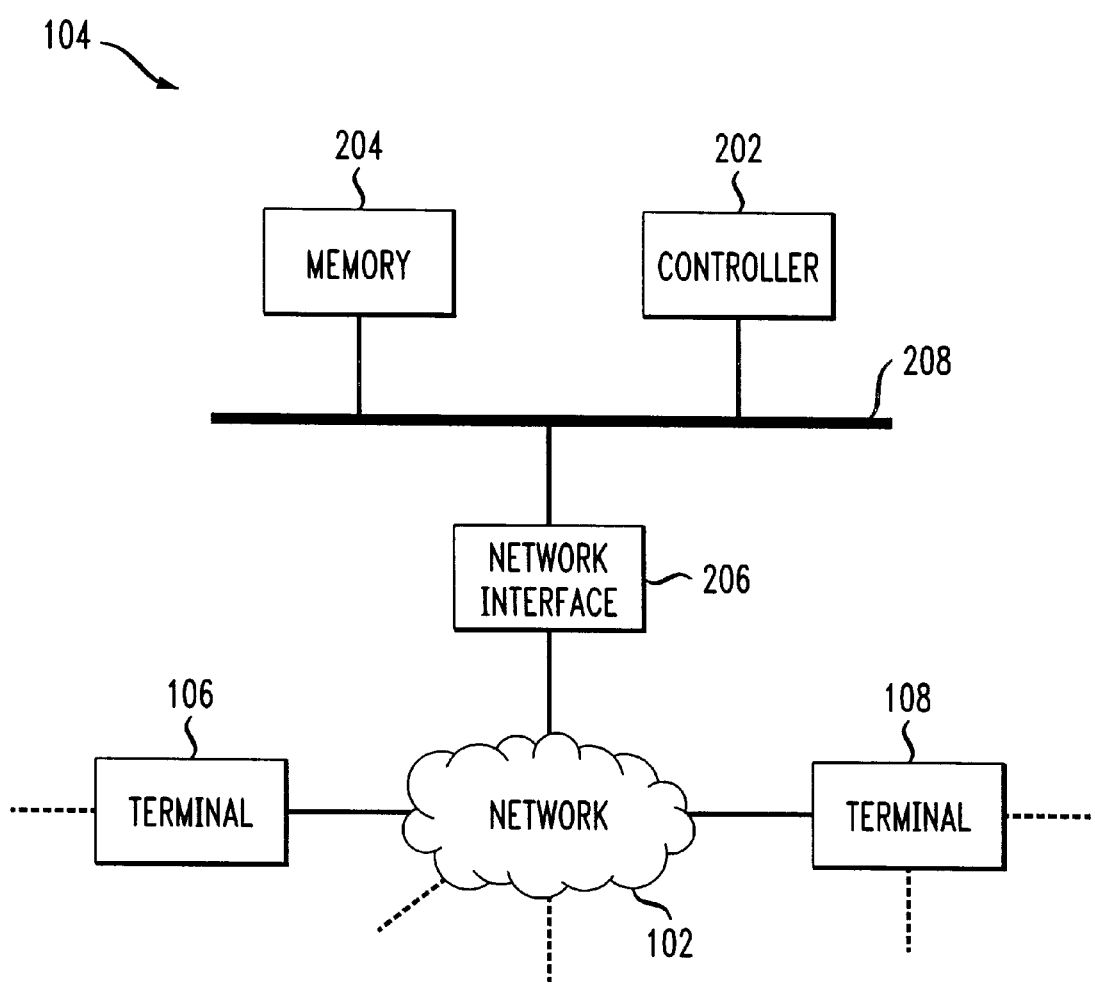
FIG. 2 shows a block diagram of a terminal connected to one of the networks of FIG. 1.

FIG. 2 shows a block diagram of one of the terminals such as the terminal 104, for example. The terminal 104 includes a controller 202, a memory 204 and a network interface 206. A user at the terminal 104 may query a distributed database whose information is accessible to the terminal 104 through the network interface 206. When a query is received, the terminal 104 broadcasts the query to all the terminals 106, 108 that contain portions of the distributed database. Each of the terminals 106, 108 processes the query independently and return partial results to the terminal 104 (called client terminal) which performs the final evaluation of the query.

Because each of the terminals 106, 108 (terminal 104 may also be included) has only a portion of the distributed database, information must be provided to the terminals 106, 108 regarding the relevance of its portion of the database in relation to the query being evaluated. In a preferred embodiment, all the terminals 106, 108 of the distributed database transmit first partial results of the query evaluation to the client terminal. The client terminal processes the partial results and returns information to each of the terminals 106, 108 that indicates the relevance of the database portion contained in those terminals. Based on the information received, each of the terminals 106, 108 transmits to the client terminal second partial results that includes those portions of the database that relates to the query being evaluated. The client terminal receives the second partial results from the terminals 106, 108 and performs a final evaluation of the query to produce the query result.

Figure 3A:
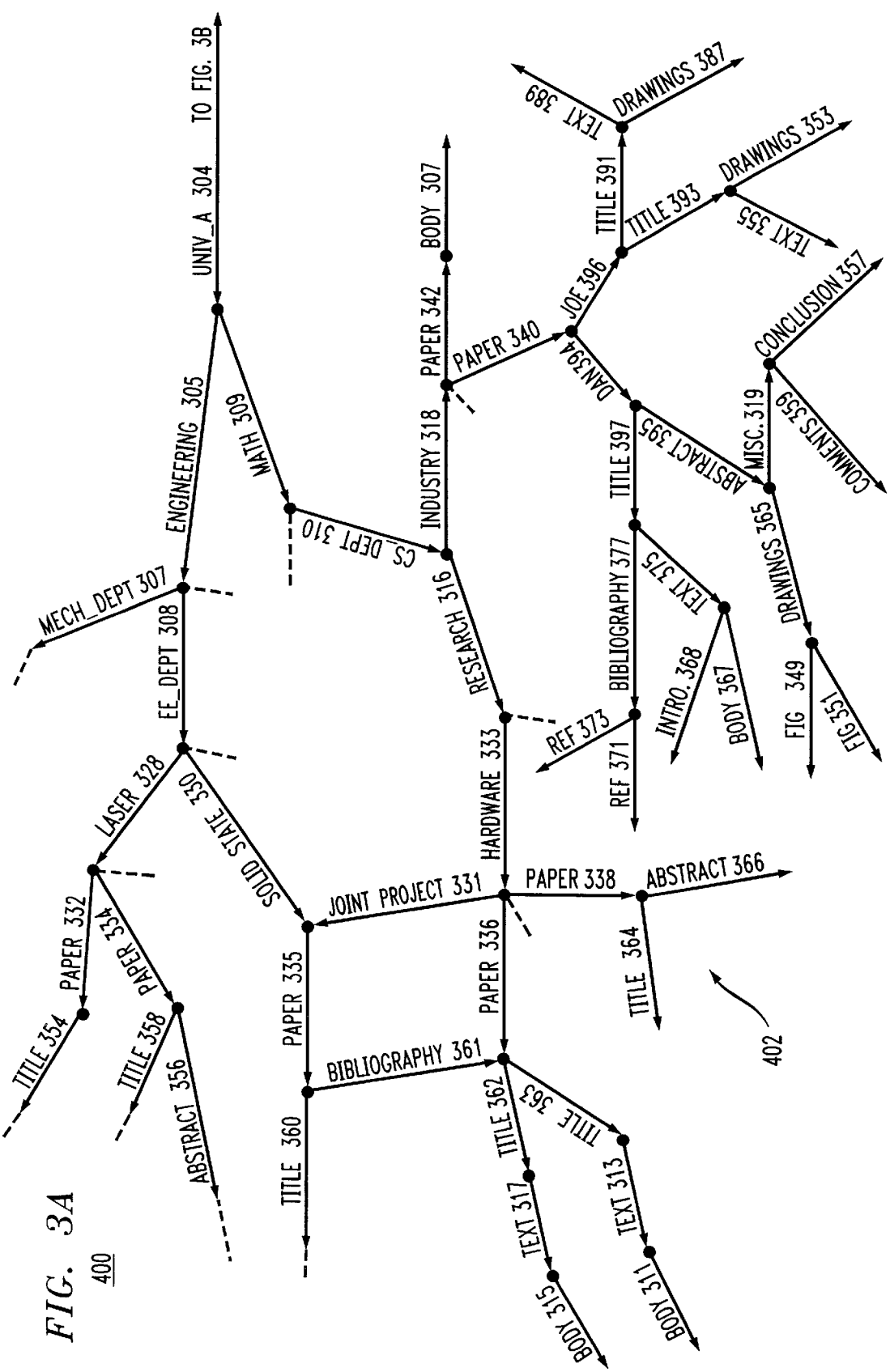
FIGS. 3A and 3B show an edge-labeled tree modeling a database.
Figure 3B:
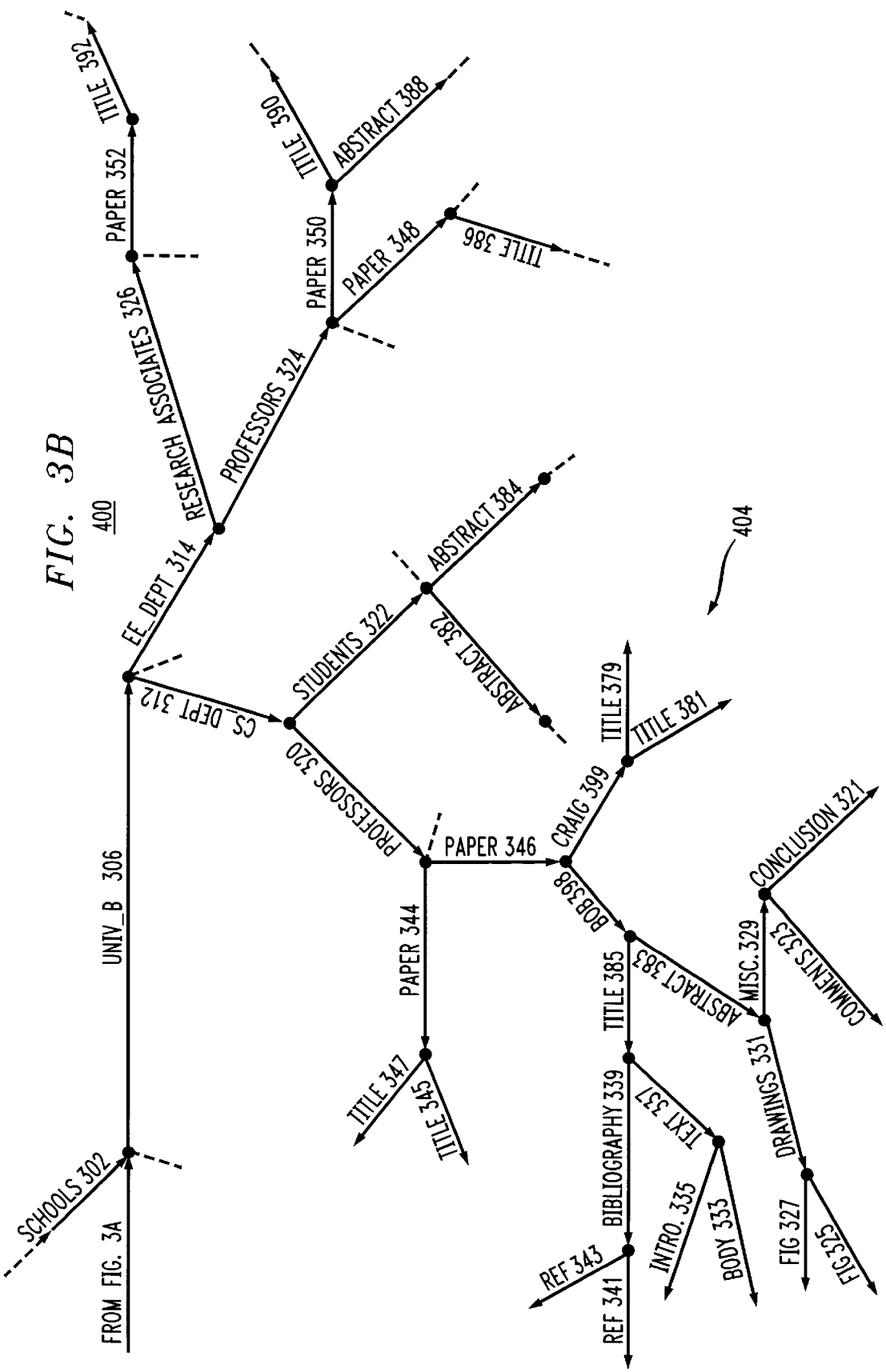

FIGS. 3A and 3B show an example of an edge-labeled tree 400 that contains information related to papers that are written in two schools UNIV-A 304 and UNIV-B 306. The left portion of the edge-labeled tree 400 shows the edge-labeled tree portion 402 depicting the papers that are written in UNIV-A 304 while the right portion of the edge-labeled tree 400 shows the edge-labeled tree portion 404 of the papers written in UNIV-B 306. The edges of the edge-labeled tree 400 are labeled by edge labels 302–399.

Queries evaluated for databases represented by the edge-labeled tree 400, for example, have varying levels of complexity. Regular path expression queries are very simple and are commonly used to extract information from edge-labeled trees such as the edge-labeled tree 400. Other queries such as extended queries and selection queries are more complex. These queries are discussed in progression of complexity.

Detailed explanations regarding the regular path expression queries are fully disclosed in U.S. patent application Ser. No. 08/864,538 which is hereby incorporated by reference. An example of a regular path expression query is as follows:

Select t

Where *=>"CS_Dept"=>not("Dept")*=>"Paper"=>t in DB.   (1)

The query (1) above produces a tree t that follows a pattern of edge-labels as specified in the Where clause. As an example, the query (1) is applied to a portion 406 of the edge-labeled tree 400, as shown in FIG. 4. The result of the query (1) is a tree shown in FIG. 5 which is obtained by evaluating the query (1) as follows:

The Where clause of the query (1) specifies a pattern that is matched by a sequence of edges labeled with "CS_Dept" and "Paper". The pattern also specifies that any number of edges may occur between the "CS_Dept" edge and the "Paper" edge as long as those edges are not "Dept" edges i.e. "EE_Dept" or "Mech_Dept". All the subtrees following edge sequences that match the pattern described above are unioned together to form a tree which is the query result.

Figure 4A:
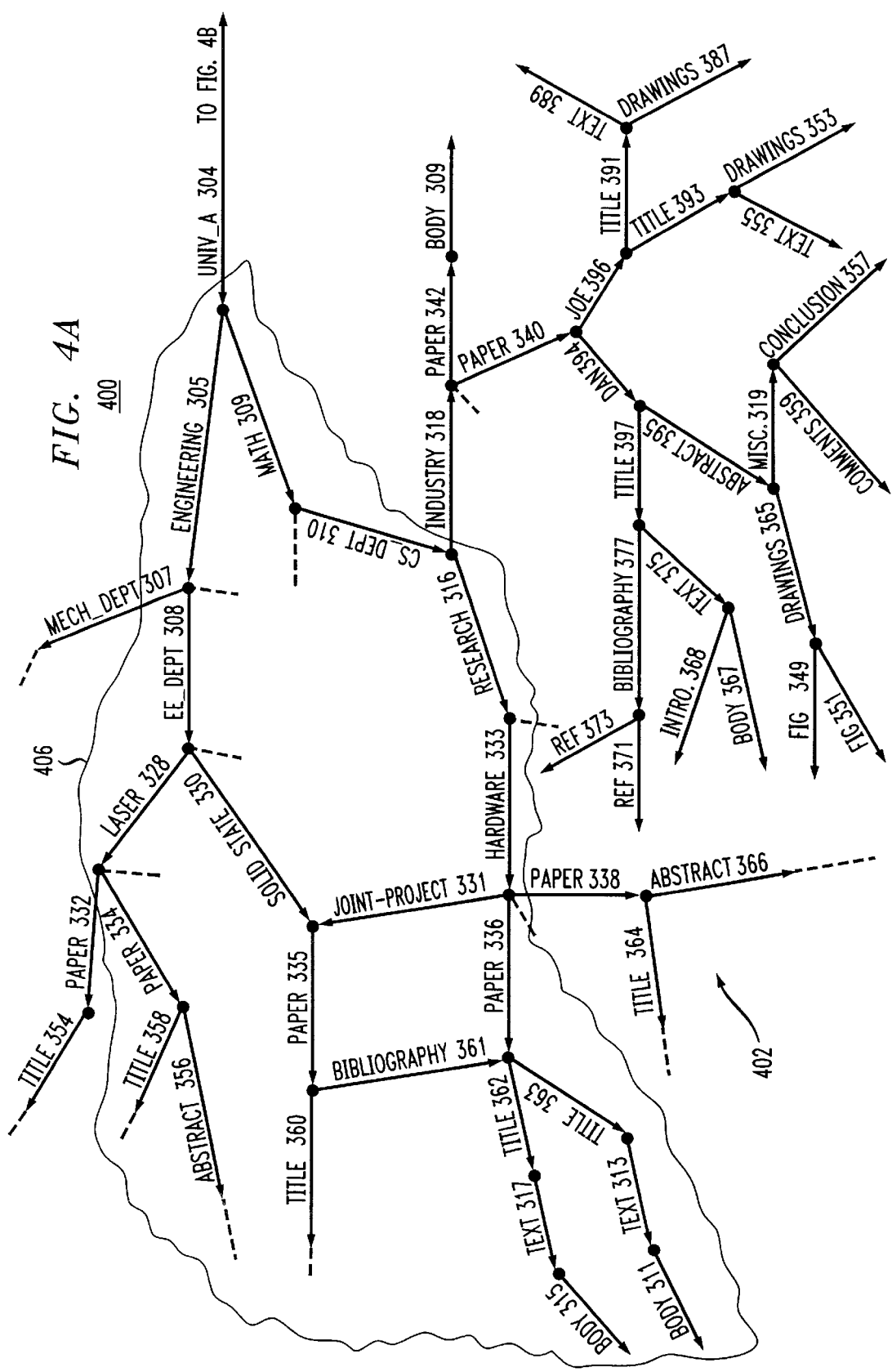
FIGS. 4A and 4B show a portion of the edge-labeled tree shown in FIG. 3.
Figure 4B:
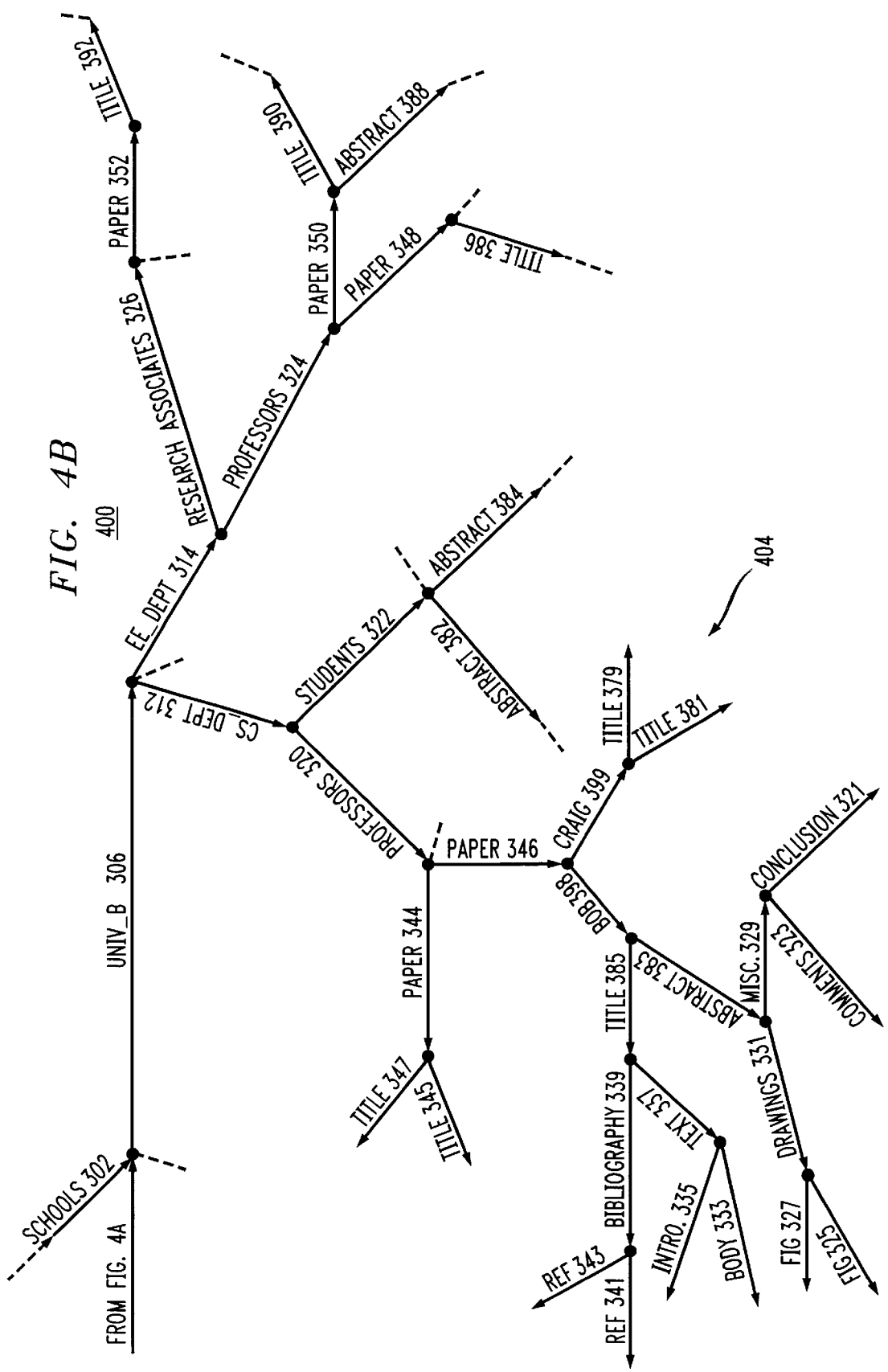

For the portion 406 of the edge-labeled tree 400 shown in FIGS. 4A and 4B, the pattern is matched by the following sequences:

1) CS_Dept 310; Research 316; Hardware 333; Joint-Project 331; Paper 335;
2) CS_Dept 310; Research 316; Hardware 333; Paper 336; and
3) CS_Dept 310; Research 316; Hardware 333; Paper 338.

Figure 5:
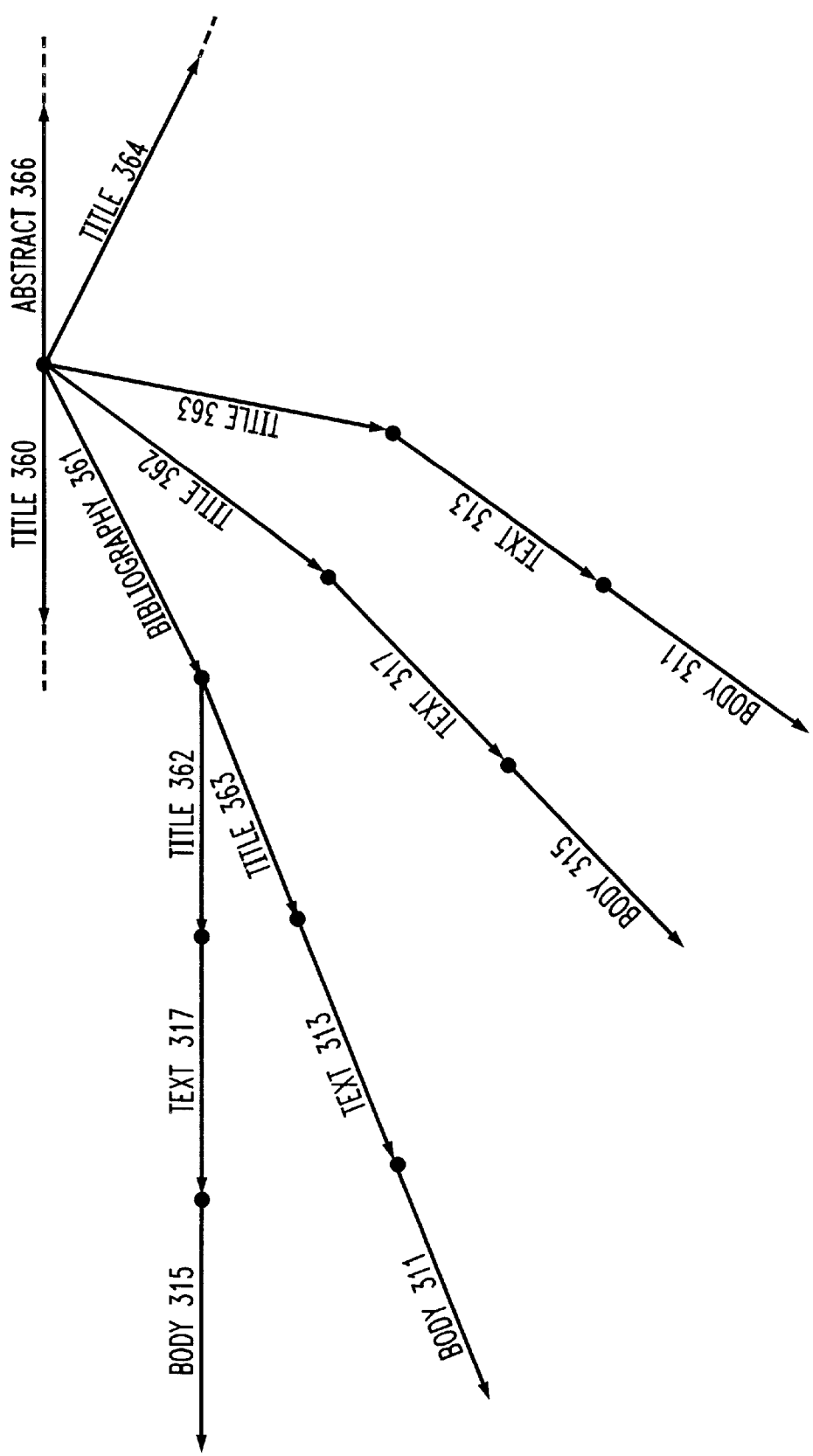
FIG. 5 shows a result of a regular path expression query applied to the portion of FIG. 4.

The subtree following the Paper 335 edge includes a subtree beginning with the edge-label Title 360 and a subtree beginning with the edge-label Bibliography 361. These two subtrees are unioned together with other subtrees as shown in FIG. 5. The subtree following the edge-label Paper 336, includes the subtree starting with the edge-label Title 362 and the subtree starting with the edge-label Title 363, also shown in FIG. 5. The subtree following the edged labeled Paper 338 (not part of the portion 406) are also included in FIG. 5, for completeness.

If the portion 406 is further decomposed into two sub-portions which are located at different sites of the university UNIV-A 304, then the query (1) evaluation cannot be performed immediately as above. Instead, terminals located at each of the respective sites (e.g., the terminals 106 and 108) must process their portions independently and the partial results generated by each of the terminals 106 and 108 must be recombined in order to obtain the query result.

Figure 6:
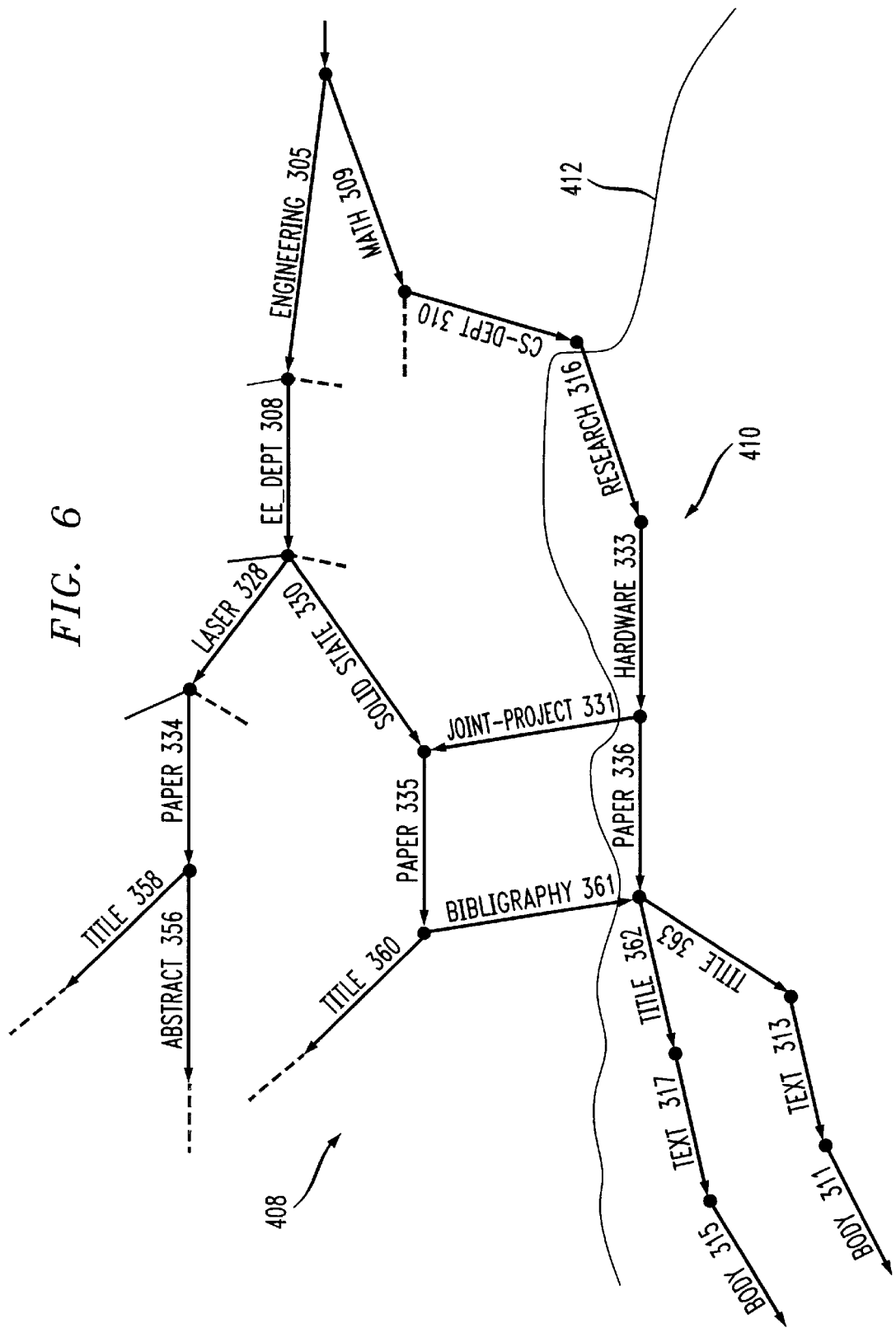
FIG. 6 shows the identified portion of the edge-labeled tree of FIG. 4 divided between two locations.

FIG. 6 shows the portion 406 divided by line 412 into two subportions 408 and 410 located at different sites. The following describes a method of the present invention for evaluating a regular expression query such as query (1) where the edge-labeled tree is decomposed into multiple portions such as shown in FIG. 6.

Figure 7:
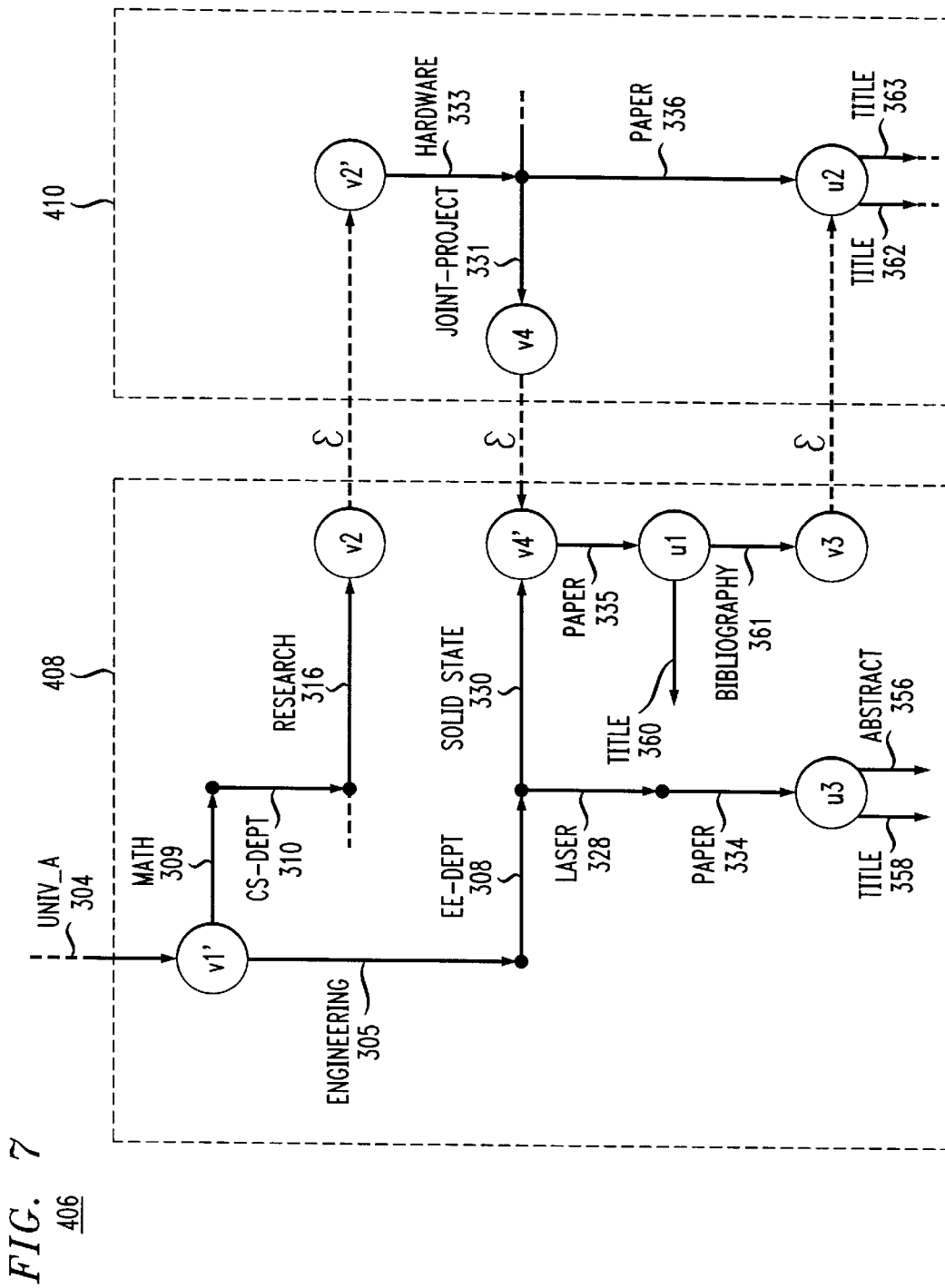
FIG. 7 shows respective portions of the divided edge-labeled tree of FIG. 6 connected by ∈ edges.

The line 412 dividing the two subportions 408 and 410 cuts across three edges: Research 316, Joint-Project 331 and Bibliography 361. As shown in FIG. 7, each of the nodes that terminate the edges 316, 331 and 361 is divided into an output node and an input node. Thus, the node terminating the Research 316 edge is divided into output node v2 and input node v2'; the node terminating the Joint-Project 331 is divided into an output node v4 and input node v4'; and the node terminating Bibliography 361 is divided into output node v3 and input node u2. v3' is replaced by u2 because u2 is a root node of a subtree that is part of the query result. The node terminating the edge UNIV-A 304 is also divided into output node v1 and input node v1'. However, the node v1 is not shown because only portion 406 is considered.

The edges Research 316, Joint-Project 331, and Bibliography 361 terminate at respective input nodes v2, v4 and v3, and the corresponding pairs of input/output nodes are connected by ∈ edges. The ∈ edges provide connection information but is not considered when evaluating the query.

The terminals 106 and 108 processing each of the subportions 408 and 410 only has immediate access to their respective subportions 408 and 410 of the edge-labeled tree. Thus, the terminal 106 processing subportion 408 follows the edge sequence Math 309, CS-Dept 310, and Research 316 ending at the output node v2. Further processing cannot be performed because the remainder portion of the portion 406 is not available. The same condition is encountered after the edge Bibliography 361 that terminates at the output node v3.

At the input node v4', the terminal 106 has no information regarding the state of the query evaluation by the terminal 108 evaluating subportion 410. Thus, the terminal 106 must evaluate the subtree below the node v4' for all states of the query evaluation that may occur prior to the node v4'. The states of a query may be determined by an automaton that models a regular expression query.

Figure 8:
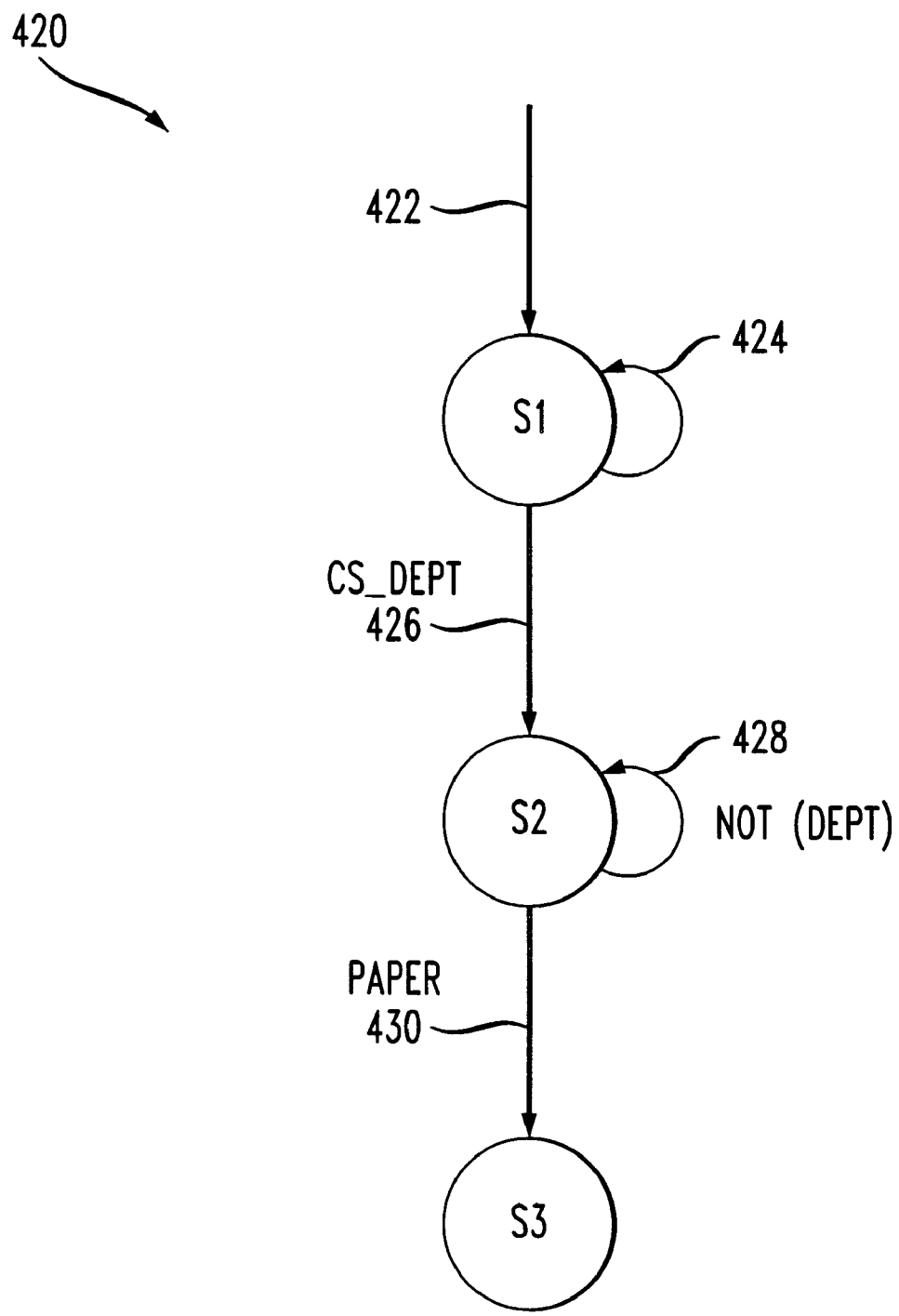
FIG. 8 shows an automation corresponding to a regular expression.

FIG. 8 shows an automaton modeling 420 the query (1). The automaton starts by entering into a state s1 from a path 422. The automaton remains in the state s1 until a CS-Dept edge is encountered. When a CS-Dept edge is encountered, the automaton 420 transitions from the state s1 into a state s2 through a path 426. The automaton 420 remains in state s1 for all other edges.

The automaton 420 remains in the state s2 when encountering any edge that is not a Dept edge via a path 428. If a "Dept" edge is encountered, the automaton 420 will be permanently stuck at s2 because all edges below a "Dept" edge are not in the query result. When a Paper edge is encountered, the automaton 420 transitions from the state s2 to a state s3 through a path 430. The state s3 is a final state because the subtree below the Paper edge is part of the result of the query (1). Thus, when processing an input node such as input node v4', the terminal 106 must process the subtree below the node v4' corresponding to each state of the automaton 420.

As shown in FIG. 7, the subtree below the input node v4' also terminates at the output node v3. Thus, the terminal 106 must provide information to the client terminal regarding all the possible states that may occur relating to the output node v3. The above process is also performed by the terminal 108 for subportion 410 for each of the input and output nodes v2', v4 and u2.

After independent processing by the terminals 106 and 108, all the results of the processing performed by the terminals 106 and 108 may be transmitted to the client terminal (terminal 104). However, because each of the terminals 106 and 108 was forced to process all the input nodes corresponding to each of the states in the automaton 420, the results generated by the terminals 106 and 108 is much larger than required to form the query result. Thus, if all the results generated by the terminals 106 and 108 are transmitted to the client terminal, the process would not be efficient based on the definition provided earlier. Accordingly, the preferred embodiment provides for a method to select only those portions of the results generated by the terminals 106 and 108 that in fact contributes to the final query result.

After the query evaluation starting with every input node-state pair is completed, the terminals 106 and 108 construct accessibility graphs and send the accessibility graphs to the client terminal. The accessibility graphs are a list of connections between input-node-state pairs and output-node-state pairs as well as between input nodes and output nodes. The size of the accessibility graph is dependent only on the complexity of the interconnections among the distributed portions of the edge-labeled tree and is independent of the size of the edge-labeled tree.

When all accessibility graphs are received, the client terminal constructs a total accessibility graph for the edge-labeled tree/query being evaluated. The client terminal determines which of the input nodes for each of the distributed portions participate in the query result and returns this information to the terminals 106 and 108. Based on the returned information, the terminals 106 and 108 identify those subtrees that contribute to the query result and transmit these subtrees to the client terminal and discard the remaining results.

Figure 9:
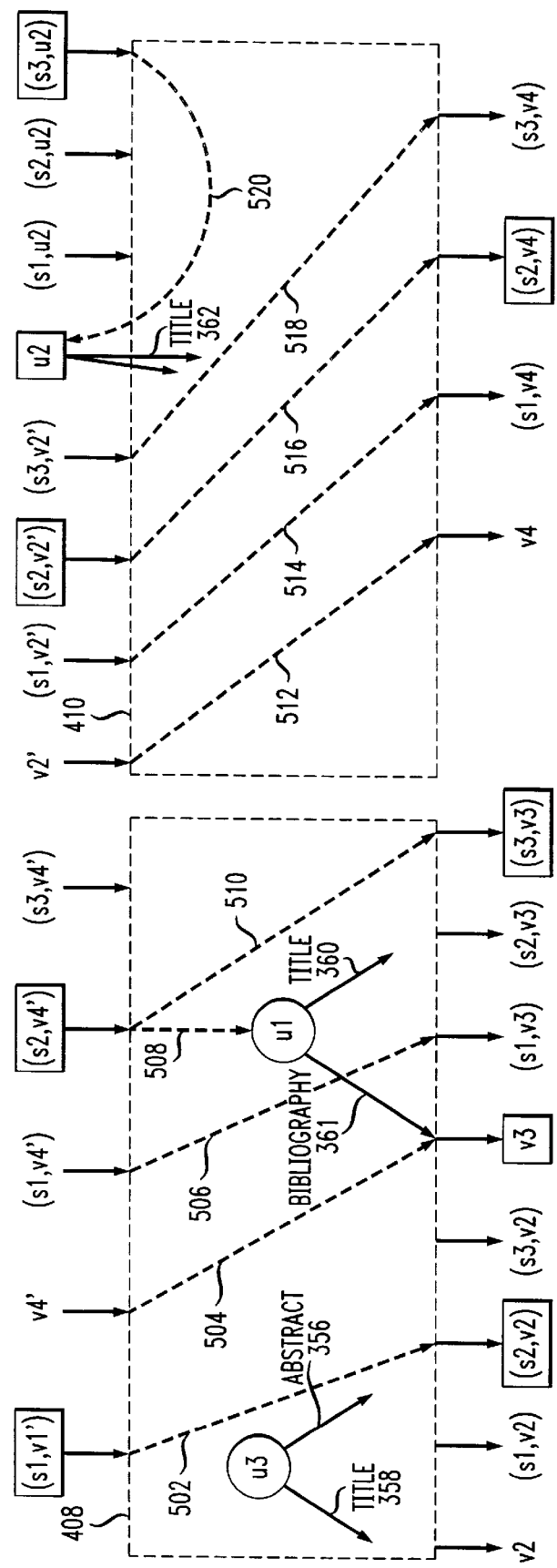
FIG. 9 shows accessibility graphs corresponding to the automation and each of the two portions of the edge-labeled tree identified in FIG. 6.

As an example, FIG. 9 shows accessibility graphs that are generated by each of the terminals 106 and 108 corresponding to query evaluation of the respective subportions 408 and 410 for the query (1). The input nodes and state-input-node pairs are shown as inputs into the accessibility graphs while the output nodes and state-output-node pairs are shown as the outputs of the accessibility graphs. The inputs to the accessibility graphs are connected to the outputs of the accessibility graphs by lines 502–520.

As discussed above, the accessibility graphs basically connects input nodes to output nodes for each state of the automaton as well as connections of the input and output nodes above. For example, the (s1, v1') pair is connected to (s2, v2) pair by the line 502. Returning to FIG. 7, if the automaton 420 was at the state s1 when entering the input node v1', the automaton 420 would transition from the state s1 to the state s2 after the edge CS-Dept 310. Thus, because the edge Research 316 connects the edge CS-Dept 310 to the output node v2, the (s1, v1') pair leads to the (s2, v2) pair. The connections between v1' and all the other output nodes are assumed and not shown because the input node v1' is also the root node for the portion 406.

Figure 10:
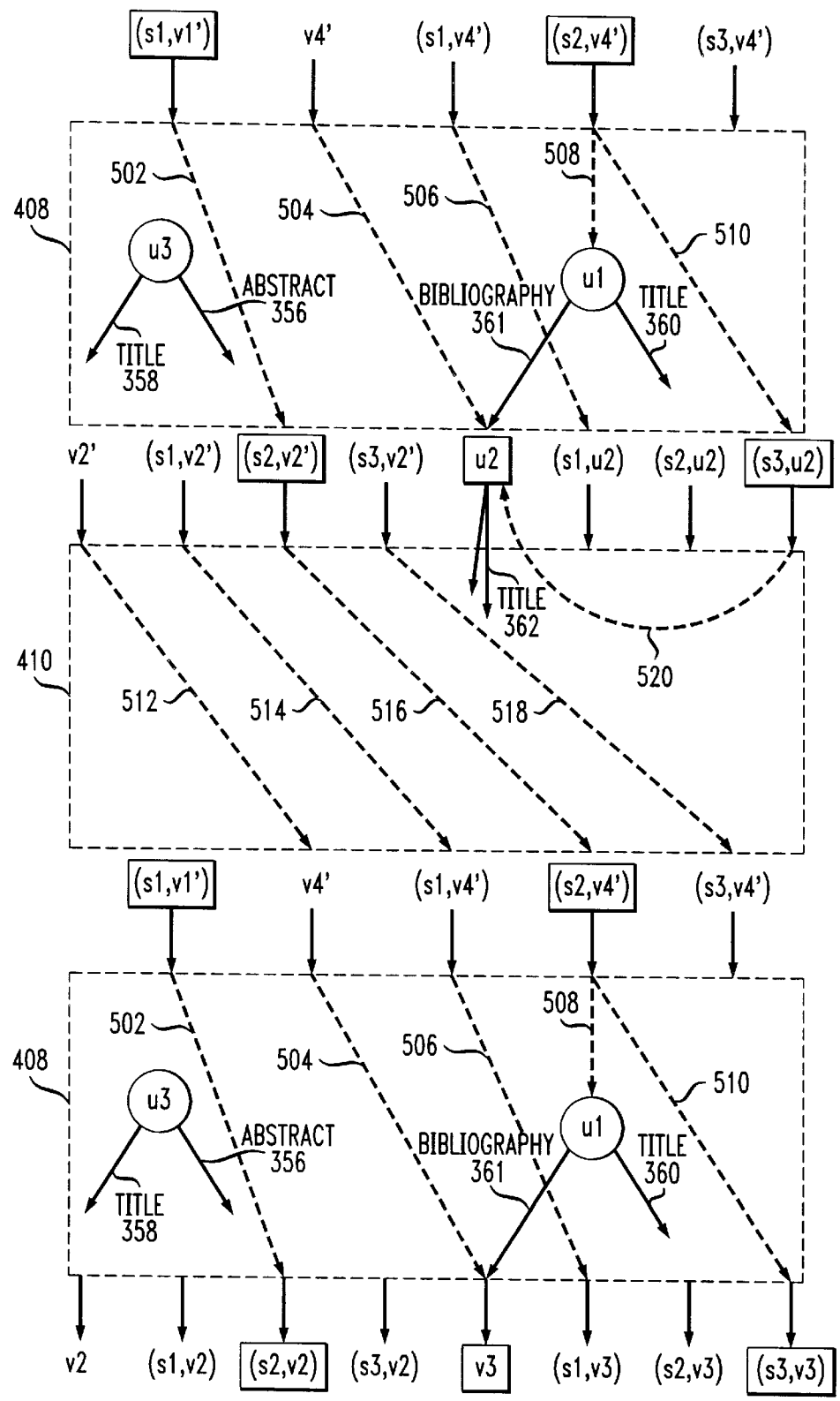
FIG. 10 shows the accessibility graphs of FIG. 9 connected to each other.

FIG. 10 shows the accessibility graphs connected to each other to form a complete accessibility graph that can be traced to determine which of the paths 502–520 lead to the query result. For example, starting with the (s1, v1') pair the line 502 leads to the (s2, v2') pair which leads to the (s2, v4') pair through the line 516. The (s2, v4') pair leads to the node u1 via line 508. The node u1 corresponds to the node at the end of edge Paper 335. Thus, the subtree below the node u1 is part of the query result as shown in FIG. 5. In addition, the (s2, v4') pair leads to the (s3, u2) pair via line 510. Thus, based on the above, the paths 502, 516 and 510 are paths that lead to the query result. The state-node pairs that lead to the query result are enclosed in rectangles.

The client terminal performs the process discussed above and shown in FIG. 10 to determine which of the state-node pairs lead to the query result and sends this information to each of the respective terminals 106, 108. Based on this information, the terminal 106 transmits to the client terminal the subtree below the node u1 and the node u3, and the terminal 108 returns the subtree below the node u2. Thus, the amount of data transferred between terminals 106 and 108 to the client terminal is dependent only on the final query result. The other partial results generated by the terminals 106 and 108 are discarded because they do not contribute to the query result.

The method described above is efficient because the total number of communication steps among the terminals is independent of the content of the distributed database or the query. The total number of communication steps among the terminals 104–108 is 4 as follows: 1) client terminal transmits the query to each of the terminals 106, 108; 2) the terminals 106, 108 transmit the accessibility graphs to the client terminal; 3) the client terminal returns accessibility graph processing results to each of the terminals 106, 108; and 4) the terminals 106, 108 transmit the partial query results to the client terminal. In addition, the total amount of data transferred among the terminals depends only on the total number of interrelationships of the database portions and the size of the evaluation result. Accordingly, the method for evaluating a regular expression query for distributed databases is efficient.

While the above method provides for efficient evaluation of regular expression queries, more complex queries require additional techniques in order to achieve efficient evaluation on distributed databases. One such query is a selection query that is defined in Table I. A detailed description of the selection query is provided by way of examples below.

TABLE I

Selection Query is:
     Selection E
     Where $C_1, \ldots, C_n$
Where E is:
 1) a tree variable;
 2) a tree constructor, $\{1_1 => E_1, \ldots, 1_k => E_k\}$;
 3) $E \cup E'$; or
 4) another Selection query.
and
each of the $C_1, \ldots, C_n$ may be:
 1) a generator which is defined as P in t wherein P is a
   pattern that an be:
   a) a tree variable,
   b) $P, \ldots, P$,
   c) $x => P$,
   d) $R => P$; or
 2) a predicate applied to label variables.

(where: x is a label variable; and R is a regular expression.)

A selection query may be as follows:

Select {x=>Select t
 Where *=>"Title"=>t in $t_1$}
Where *=>"Paper"=>x=>$t_1$ in DB.   (2)

Figure 11:
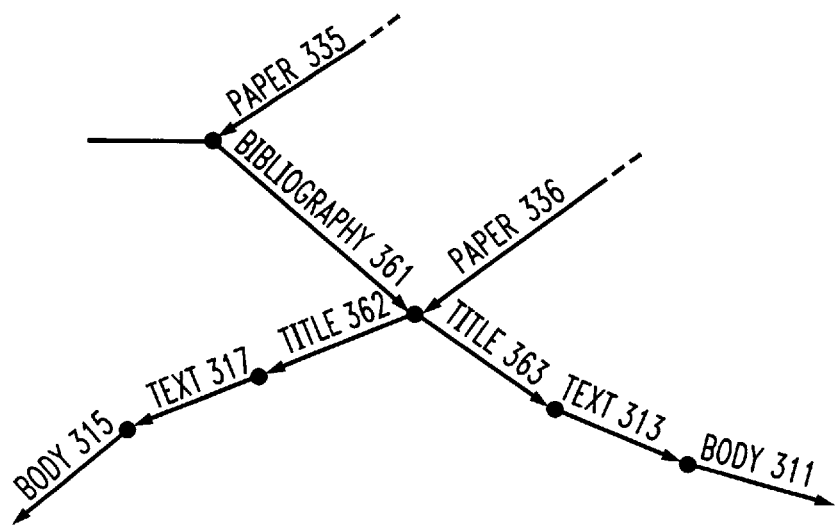
FIGS. 11–13 show subtrees of the edge-labeled tree of FIG. 3.
Figure 14:
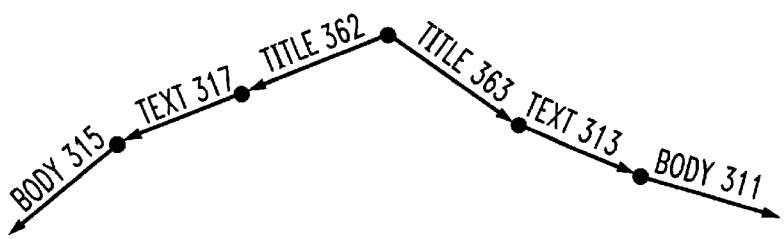
FIGS. 14–18 show subtrees resulting from a selection query when applied to the subtree of FIG. 11.
Figure 15:
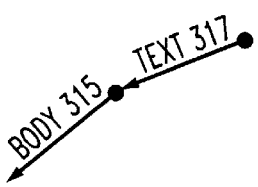
Figure 16:
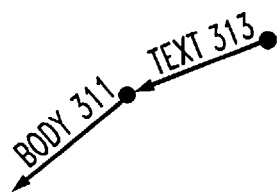

The above selection query (2) first matches the pattern of the outer Select-Where block to identify a subtree $t_1$. For example, when applied to a portion of the edge-labeled tree 400 shown in FIG. 11, the pattern in the Where clause of the outer block binds the tree variable $t_1$ to the three trees shown in FIGS. 14–16. In FIG. 14, the label variable x binds to Bibliography 361 following Paper 335. Thus, the subtree $t_1$ is as shown in FIG. 14. The x label variable also binds to Title 362 and Title 363 because these two edges follow Paper 336. Thus, $t_1$ also binds to the subtrees shown in FIG. 15 and FIG. 16 corresponding to Title 362 and Title 363, respectively.

The Where clause of the inner Select-Where block has a pattern that requires the subtree t to follow an edge-labeled "Title" in the $t_1$ subtrees. Applying the Where clause pattern of the Select-Where block to the $t_1$ shown in FIG. 14–16, only the subtree $t_1$ shown in FIG. 14 matches such a pattern because only this subtree $t_1$ has edges with "Title" as a label. The subtree $t_1$ shown in FIG. 15 and FIG. 16 do not contain an edge-labeled with "Title". The resulting subtree t is shown as the lower four edges in FIG. 17.

Figure 17:
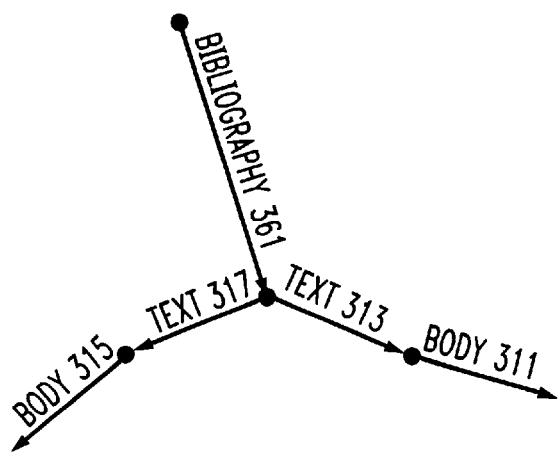

The Select clause of the outer Select-Where block contains a generator that generates a tree having an edge-labeled by the label variable x that emanates from the root of the resulting tree and ends in the subtree t. Because the x label variable of the subtree $t_1$, shown in FIG. 14 is Bibliography 361, the result of the query (2) has an edge from the root node labeled as Bibliography 361 that points to the subtree t as shown in FIG. 14. Thus, FIG. 17 shows the result of the query (2).

The Selection clause of a Selection query may generate a tree in such a way that increases the difficulty of evaluating the selection query on distributed databases. For example, if the selection query (2) above is modified as follows:

Select {x=>t}

Where *=>"Paper"=>x=>*=>"Title"=>t in DB,   (3)

the query result is different than the result of the query (2).

Figure 18:
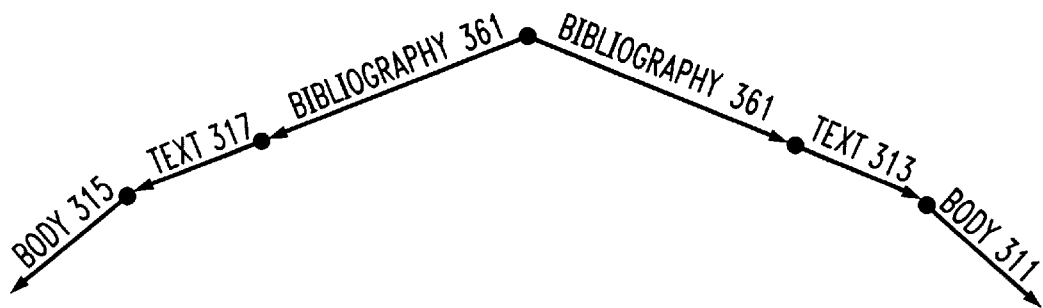

The Where clause of the query (3) is merely the concatenation of the pattern of both Where clauses of the query (2). However, because the Select clause generates a subtree which is a union of subtrees having a first edge-label x that leads to a subtree t identified by the pattern in the Where clause, the subtree under Bibliography 361 having initial edges labeled by Title 362 and Title 363 are separated into two independent subtrees instead of a single subtree that is the union of the subtrees below the Title 362 and the Title 363 edges as shown in FIG. 14. Thus, the query result for the query (3) replicates the edge-label Bibliography 361 twice, once for each subtree t. The two edge labels Bibliography 361 are unioned together to form the root node as shown in FIG. 18.

If the query (3) is applied to a distributed database, a terminal having immediate access to only a portion of the database could not process the Select clause of the query (3) because the information required to perform the Select clause evaluation can only be done globally. For example, a first terminal having only a portion of the edge-labeled tree cannot determine whether a second terminal having another portion of the edge-labeled tree contains a subtree that satisfies the Where clause pattern. If such subtrees exist, the subtrees of the first and second terminals must be unioned together to form the query result. Thus, the Select clauses of selection queries such as selection query (3) cannot be performed in a distributed manner. However, the Where clauses may be performed distributively as discussed below.

The selection query (2) above is a special selection query called extended regular query. A definition of the extended regular query is shown in Table 2. In summary, an extended regular query permits only one tree variable t in the Where clause pattern and possibly a label variable x occurring right before t. The label variable x and the tree variable t may be used in constructors of the Select clause. However, x and t may not be used in other select subqueries except that t may be used in immediate subqueries in which the Where clause of the subquery is searching for a pattern in t.

TABLE II

Extended Regular Query Q(t) or Q(x,t) is one of
1) t;
2) {};
3) {a => $Q_1(x,t)$}
4) $Q_1(x,t) \cup Q_2(x,t)$
5) Select $Q_1(t_1)$ where R => $t_1$ in t;
6) Select $Q_1(x_1,t_1)$ where R => $x_1$ => $t_1$ in t, $P(x_1)$ (where: a is either x or a label constant; and $P(x_1)$ is a unary predicate)

As an example, the following extended regular query is applied to the edge-labeled tree shown in FIGS. 3A and 3B:

Select {x=>(Select{y=>$t_1$}

Where *=>"Title"=>y=>$t_1$ in t)∪

(Select {z=>$t_2$}

Where *=>"Abstract"=>z=>$t_2$ in t)}

Where *=>"Paper"=>x=>t in DB. (4)

The Where clause of the outer Select-Where block specifies the pattern that searches for a "Paper" edge label followed by a label variable x. Applying this Where clause to the edge-labeled tree 400 shown in FIG. 3 results in the many subtrees that bind to t. For example, following the edge label sequence UNIV-A 304, Engineering 305, EE-Dept 308, and Laser 328, two Paper labels are encountered: Paper 332 and Paper 334. The Where clause requires a single variable x to precede the subtree t. Thus, if x binds to the edge label "Title", then Title 354 and Title 358 both bind to x. Thus, the subtree t would be the subtree below Title 354 and Title 358 as shown by the dash lines.

Figure 12:
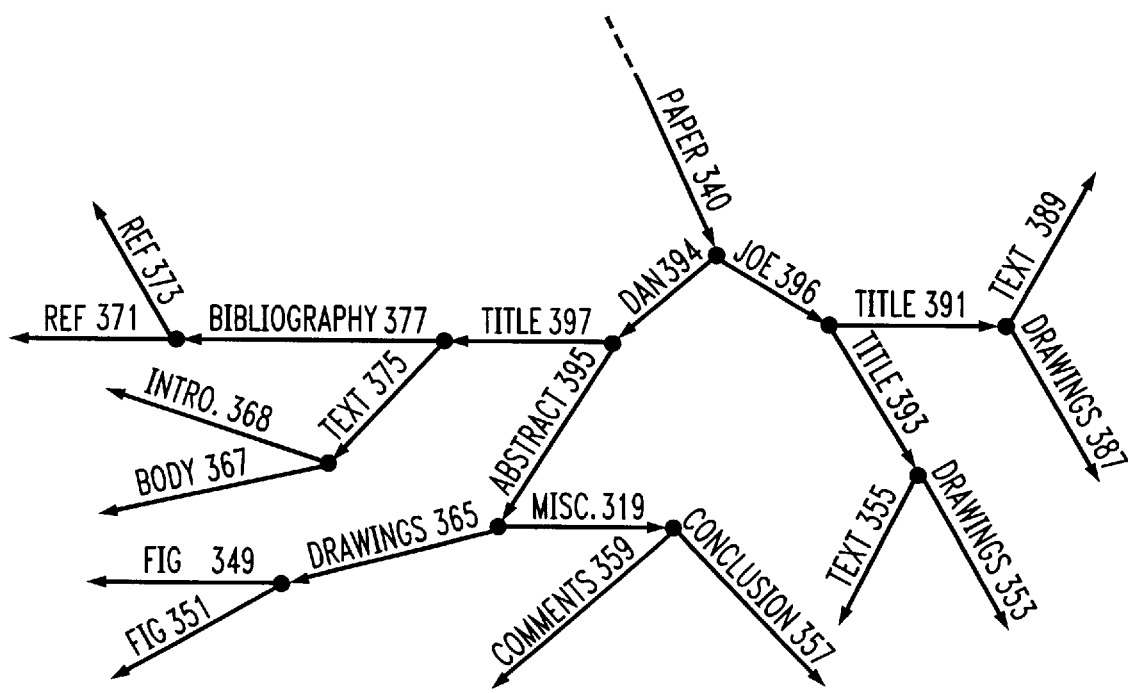
Figure 13:
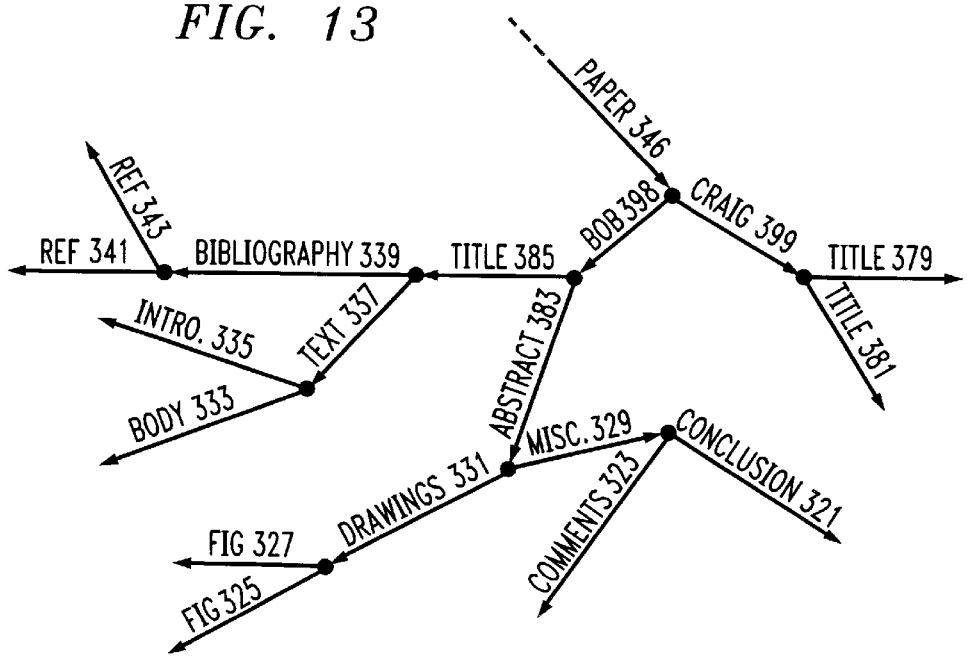

While the Where clause of the outer Select-Where block binds to the subtrees below the Title 354 and Title 358, the patterns of the Where clauses of the inner Select-Where block could not be matched. The first inner Select-Where subblock requires a Title edge followed by a label variable y. However, the Title edges 354 and 358 has already been bound to x by the Where clause of the outer Select-Where block. Thus, assuming that the subtrees below the Title edges 354 and 358 do not contain either Title or Abstract labels, the patterns of the Where clauses of the inner Select-Where subblocks cannot be matched. Accordingly, the subtrees below the Title edges 354 and 358 do not contribute to the query result. The same reasoning may be applied to all the other subtrees in the tree 400 except for the subtrees shown in FIGS. 11–13.

Figure 19:
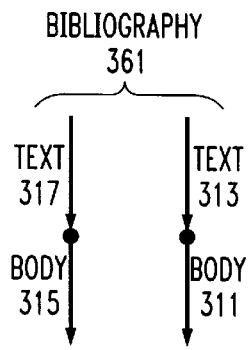
FIGS. 19–23 show the subtrees resulting from a first expression of an extended regular query.
Figure 20:
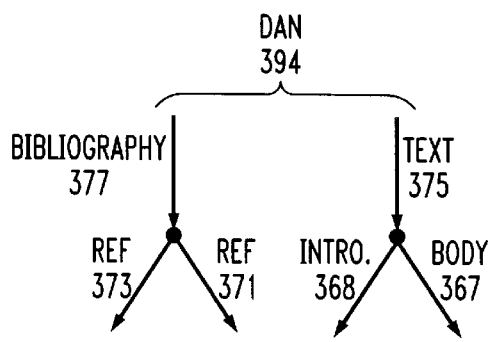

FIGS. 19–23 show the subtrees $t_1$ after applying the Where clause pattern of the first inner Select-Where subblock. The Where clause requires a Title edge followed by a variable. Thus, this pattern is matched by the subtree shown in FIG. 11 and $t_1$ binds to the subtree below Text 317 and the subtree below Text 313. FIG. 19 shows the y variable Text 317 and $t_1$ below Text 317 as well as y variable Text 313 and the subtree $t_1$ below Text 313.

Figure 21:
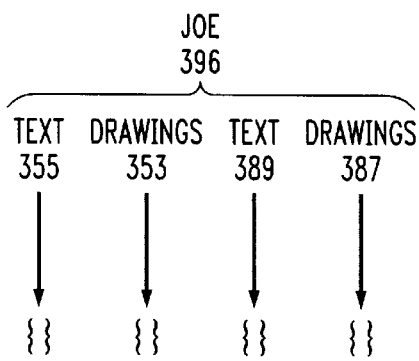
Figure 22:
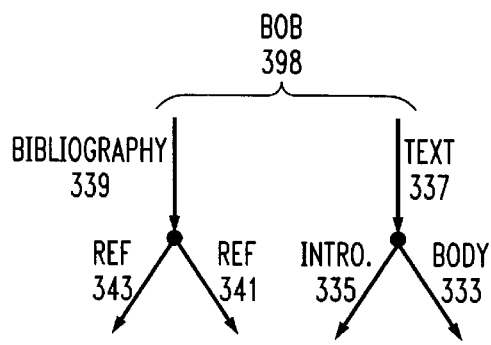
Figure 23:

FIGS. 20–23 show the y variables and the subtrees $t_1$ below the y variables corresponding to each of the subtrees $t_1$ followed by the variable x. For example, FIG. 20 corresponds to the x variable Dan 394 and the y variables Bibliography 377 and Text 375 following the Title edge 397. FIG. 21 shows the subtrees $t_1$ (empty subtrees) corresponding to x variable Joe 396 and y variables Text 355, Drawings 353, Text 389 and Drawings 387 following the Title edges 393 and 391. FIG. 22 shows the subtrees $t_1$ corresponding to x variable Bob 398 and y variables Bibliography 339 and Text 337 following the Title edge 385. Finally, FIG. 23 shows the subtree $t_1$ (empty subtree) corresponding to x variable Craig 399. The y variables following Craig 399 are empty edges and the subtree $t_1$ are also empty because the Title edges 381 and 379 terminate at leaf nodes which are empty subtrees.

Figure 24:
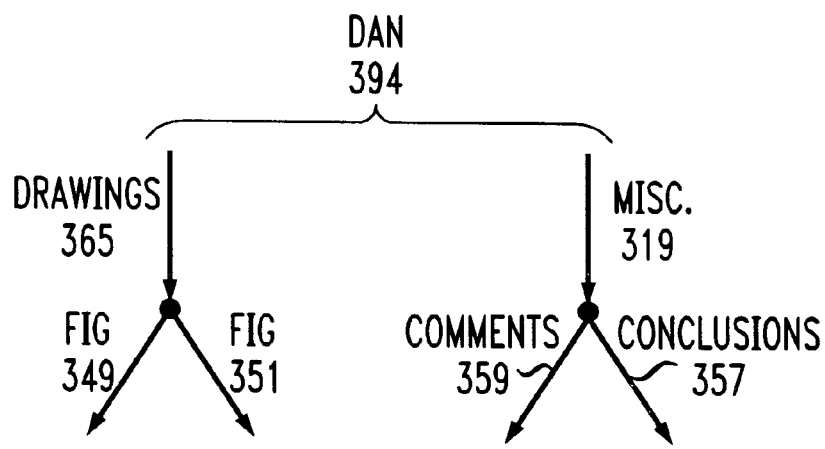
FIGS. 24 and 25 show the subtrees resulting from a second expression of the extended regular query.
Figure 25:
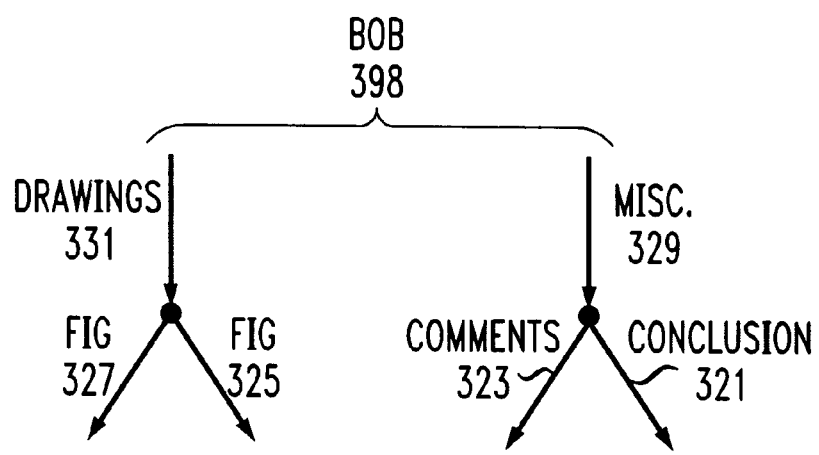
Figure 26:
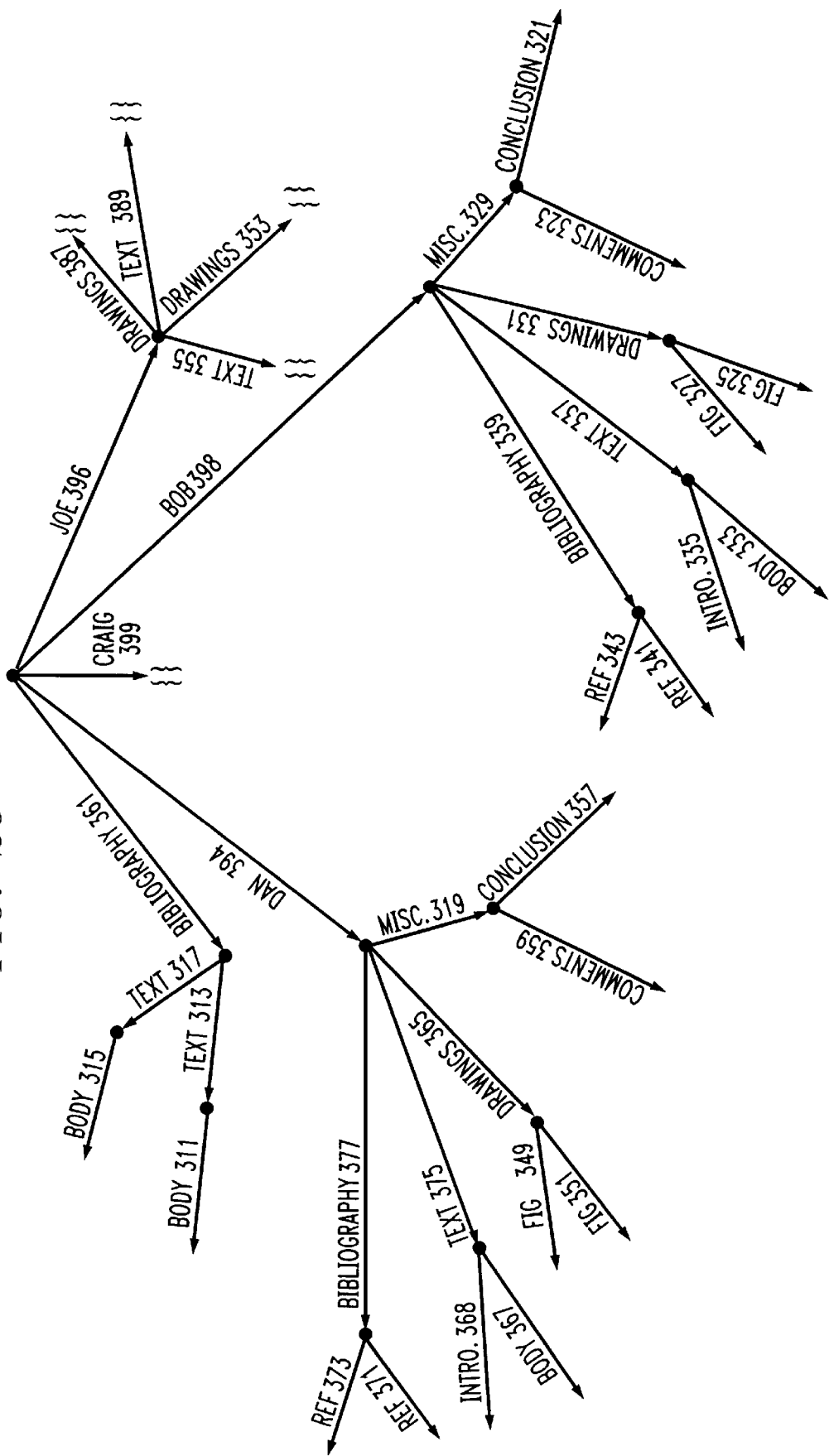
FIG. 26 shows the result of the extended regular query.

A corresponding analysis for the Where clause of the second inner Select-Where subblock of the extended regular query (4) are shown in FIGS. 24 and 25. The result of the complete extended regular query (4) is shown in FIG. 26.

The extended regular query Select clause has a generator generating an edge-labeled by the label variable x with subtrees starting with an edge-labeled by the label variables y and z ending in subtrees $t_1$ and $t_2$. Thus, the result is a tree having edges emanating from the root node labeled by the x variables Bibliography 361, Dan 394, Joe 396, Bob 398 and Craig 399. Under Bibliography 361, only y variables were found. Thus, the subtree below Bibliography 361 are y variables Text 317 and y variables Text 313 followed by their respective subtrees $t_1$. Below the edge-labeled by Dan 394, are y variables Bibliography 377 and Text 375 followed by the respective subtrees $t_1$ as well as z variables Drawings 365 and Misc 319 followed by the respective subtrees $t_2$. The x variable Craig 399 is followed only by an empty subtree because the y variable following Titles 381 and 379 is empty and the subtree $t_1$ is also empty. The y variables Bibliography 339 and Text 337 together with their corresponding subtrees $t_1$ follow the x variable edge Bob 398. The z variables Drawings 331 and Misc 329 together with their subtrees $t_2$ also follows the x variable edge Bob 398. The y variables Text 355, Drawings 353, Text 389 and Drawings 387 together with the empty subtrees $t_1$ follows the x variable edge Joe 396.

The extended regular query (4) described above may be efficiently evaluated when the database is decomposed across multiple sites. The only difference between an extended regular query and a regular expression query is the use of variables. The following example shows that a similar technique used for evaluating regular expression queries across distributed databases may be used to evaluate extended regular queries across distributed databases.

Figure 27:
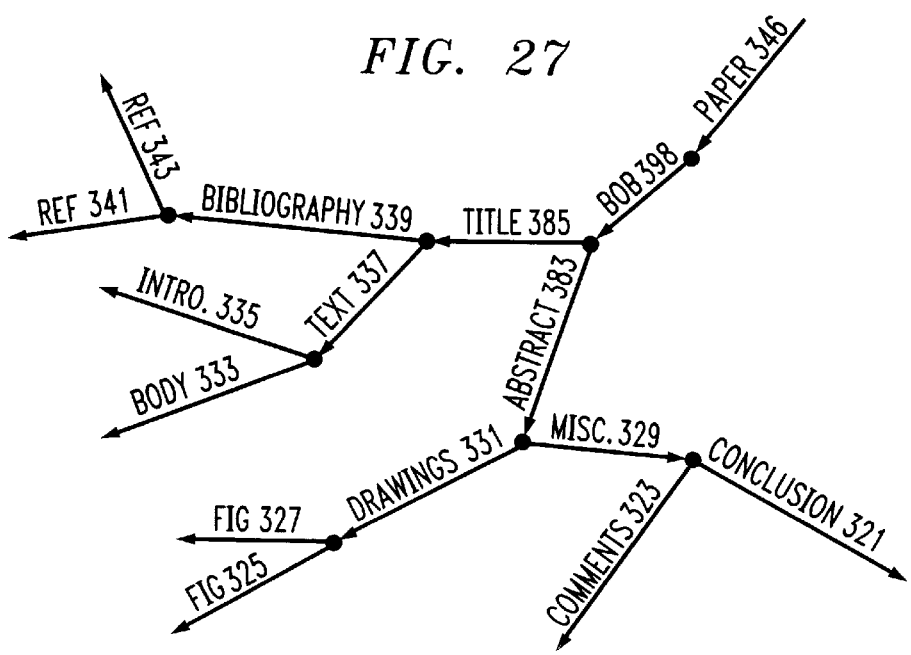
FIG. 27 shows a portion of the edge-labeled tree shown in FIG. 3.
Figure 28:
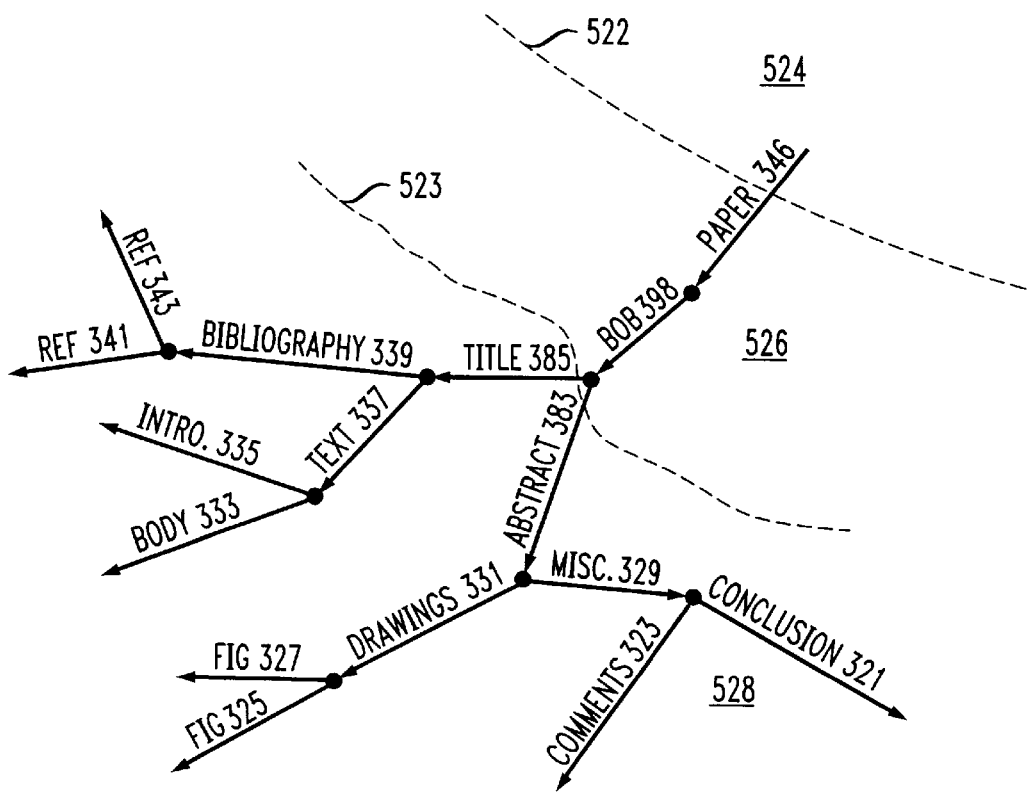
FIGS. 28 and 29 show a division of the edge-labeled tree shown in FIG. 27 between three locations.
Figure 29:
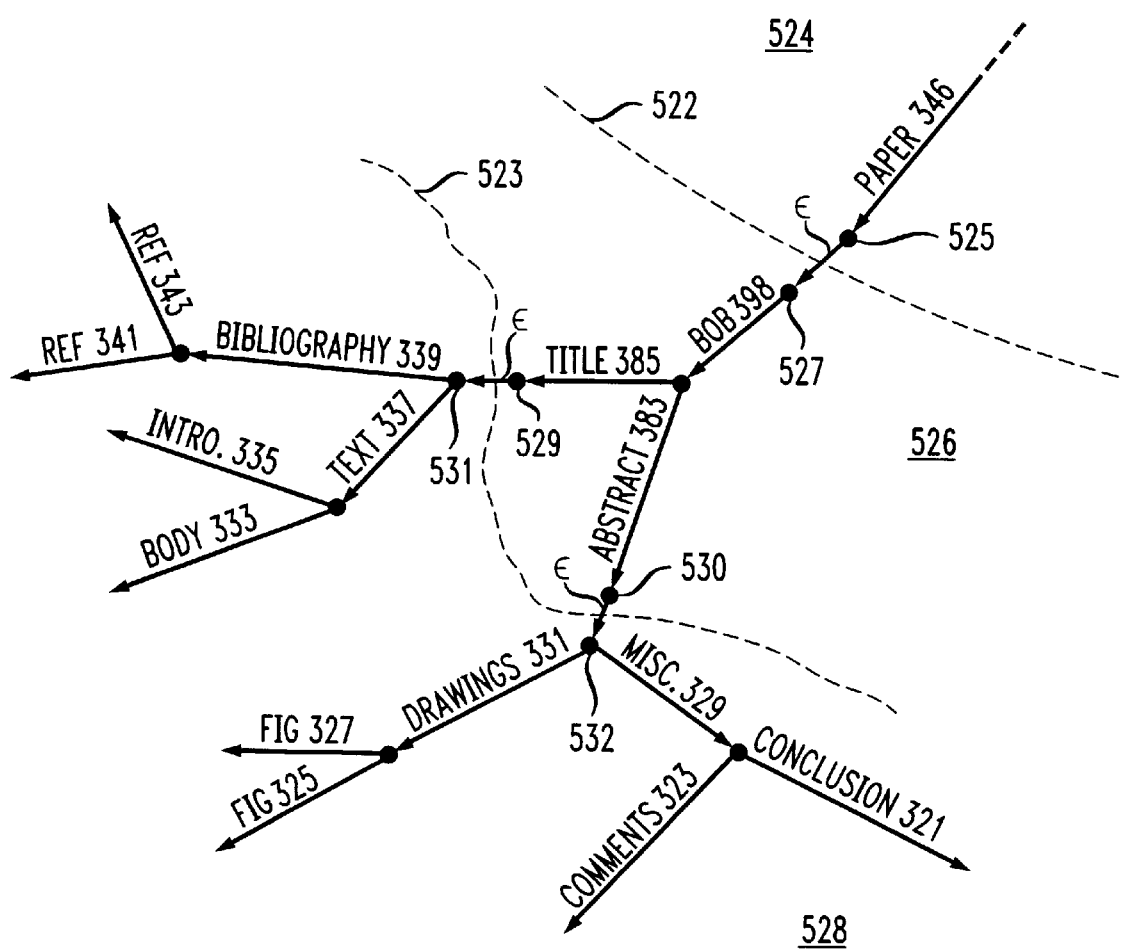

FIG. 27 shows a subtree of the edge-labeled tree 400 shown in FIGS. 3A and 3B below the edge-labeled Paper 346. FIGS. 28 and 29 show the above subtree being decomposed among three sites dividing the subtree at the lines 522 and 523 into subtree portions 524, 526 and 528. The node between the edge label Paper 346 and the edge label Bob 398 is separated into input and output node pairs 525 and 527, respectively, and the nodes immediately below the edge label Title 385 and Abstract 383 are separated into output and input node pairs 529, 531 and 530 and 532, respectively. All input and output node pairs are connected by an ∈ edge as was done for regular expression queries discussed above.

Figure 30:
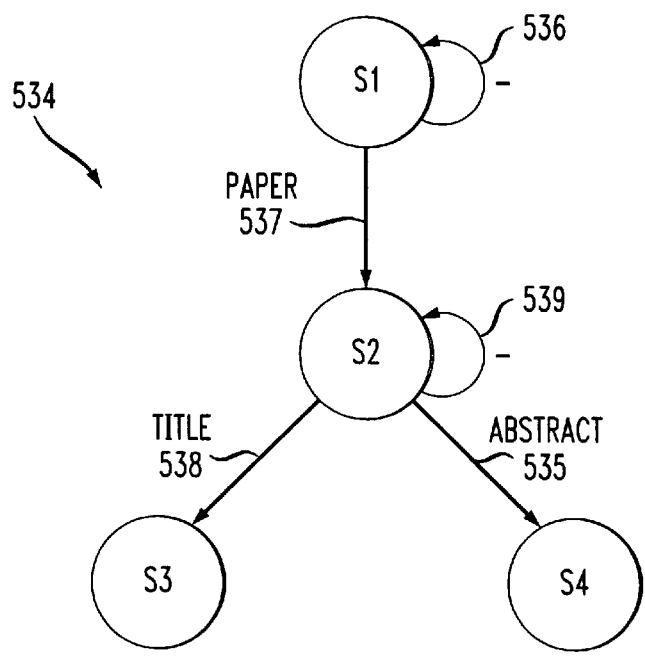
FIGS. 30 and 31 show a state diagram and a portion of the edge-labeled tree of FIG. 27.

FIG. 30 shows a state diagram 534 corresponding to the extended regular query (4). The state diagram 534 is similar to the automaton 420 that corresponds to a regular expression query. However, an automaton is only defined for a regular expression query, and not for an extended query.

The state diagram 534 begins at state s1. When traversing through an edge-labeled tree and edge labels other than Paper are encountered, the state of the state diagram remains in state s1 by traversing through path 536. If a Paper Ledge is encountered, the state diagram transitions from the state s1 to state s2 through path 537. At state s2, there are three possible paths: (1) path 539 is traversed whenever edge labels are encountered that are not Title or Abstract; (2) path 538 is traversed when a Title edge label is encountered; and (3) path 535 is traversed when an Abstract edge label is encountered. When the Title edge label is encountered, the state diagram transitions from the state s2 to the state s3 and when the Abstract edge label is encountered, the state diagram transitions from the state s2 to the state s4.

Figure 31:
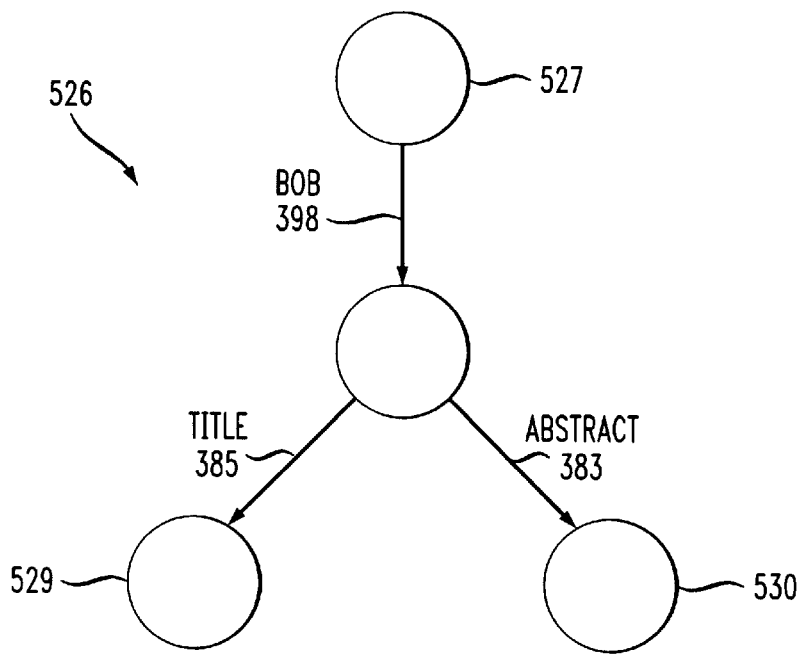

FIG. 31 shows the edge-labeled tree portion 526 of FIG. 29. A terminal, such as terminal 106, for example, evaluating the extended regular query (4) on the edge-labeled tree portion 526 must begin at input node 527 for each state of the state diagram 534. Thus, starting with the state s1, the state diagram 534 would remain in state s1 after traversing the edge-labeled tree portion 526 ending at output nodes 529 and 530.

Starting with the state s2, the state diagram would transition to state s3 when traversing the edge label Title 385, and the state diagram would transition to the state s4 when traversing the edge label Abstract 383. The states s3 and s4 correspond to the inner Where clauses of the extended regular query (4) and thus, the subtrees below the output node 529 and 530 contain the query result.

Figure 32:
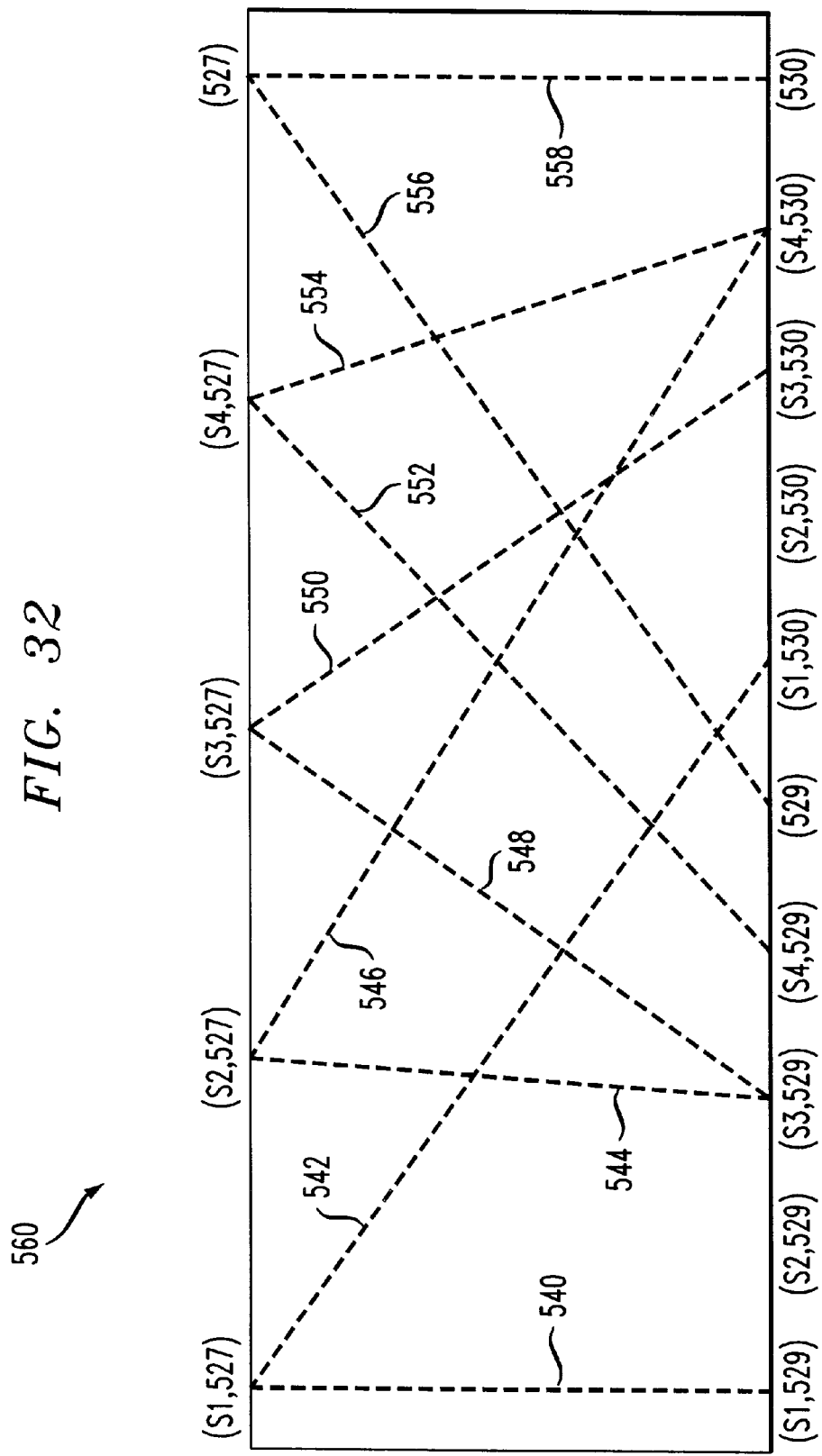
FIG. 32 shows an accessibility diagram for the portion of the edge-labeled tree of FIG. 31 for the extended regular query.

The above analysis of the state diagram 534 and the edge-labeled tree portion 526 is summarized in an accessibility graph 560 shown in FIG. 32. This accessibility graph corresponds to the accessibility graph shown in FIG. 9 for the regular expression query. Thus, the lines 540–558 connecting the state-input node pairs and state-output node pairs summarizes the traversal of the edge-labeled tree portion 526 for the extended regular query (4). Similar to the process performed for the regular expression query, each of the terminals 106, 108 performing the extended regular query (4) for each of the sites generates the respective accessibility graphs 560 and transmits the accessibility graphs to the client terminal. The client terminal combines all the accessibility graphs and determines which of the lines 540–588 lead to successful query results. The client terminal returns information to each of the terminals indicating which of the subtree portions contribute to the final query result. The terminals then return to the client terminal those subtrees that contribute to the query result so that the final query result may be assembled by the client terminal by processing the select clause.

The above process is efficient for evaluating extended regular queries across multiple sites because the total number of communication steps among the terminals is independent of the content of the decomposed database or the query; and the total amount of data transferred among the terminals depends only the total number of interrelationships of the decomposed database portions. Thus, the process for evaluating extended regular queries of databases decomposed across multiple sites is efficient.

The following is an example of a more complex selection query:

Q(DB)=Select Select {Univ_Papers=>{"Author"=>x,"Paper"=>t, "Title"=>$t_1$,"Abstract"=>$t_2$}}

Where *=>"Title"=>$t_1$ in t

*=>"Abstract"=>$t_2$ in t

Where *=>CS_Dept=>*=>"Paper"=>x=>t in DB          (5)

The selection query 5 shown above is more complex than an extended regular query because this query requires that both Title and Abstract edges be combined in the query result by the select clause. The Where clause of the outer Select-Where subblock requires a pattern of CS_Dept and Paper edges separated by any number of other edges. The subtree t below the Paper edge must contain both a Title edge and an Abstract edge in order to contribute to the query result. The Select clause of the inner-Select-Where subblock requires the subtrees t, $t_1$ and $t_2$ corresponding to the subtrees below the Paper edge, the Title edge and the Abstract edge, respectively. While, as discussed earlier, the Select clause cannot be performed distributively by each of the terminals corresponding to the various sites, the Where clauses may be performed by each of the terminals of the various sites to obtain a partial query result similar to the process performed for the extended regular query. The additional requirement for both the Title and the Abstract edges to be found in the subtree t requires an enhancement to the accessibility graphs generated for the extended regular query.

Figure 33:
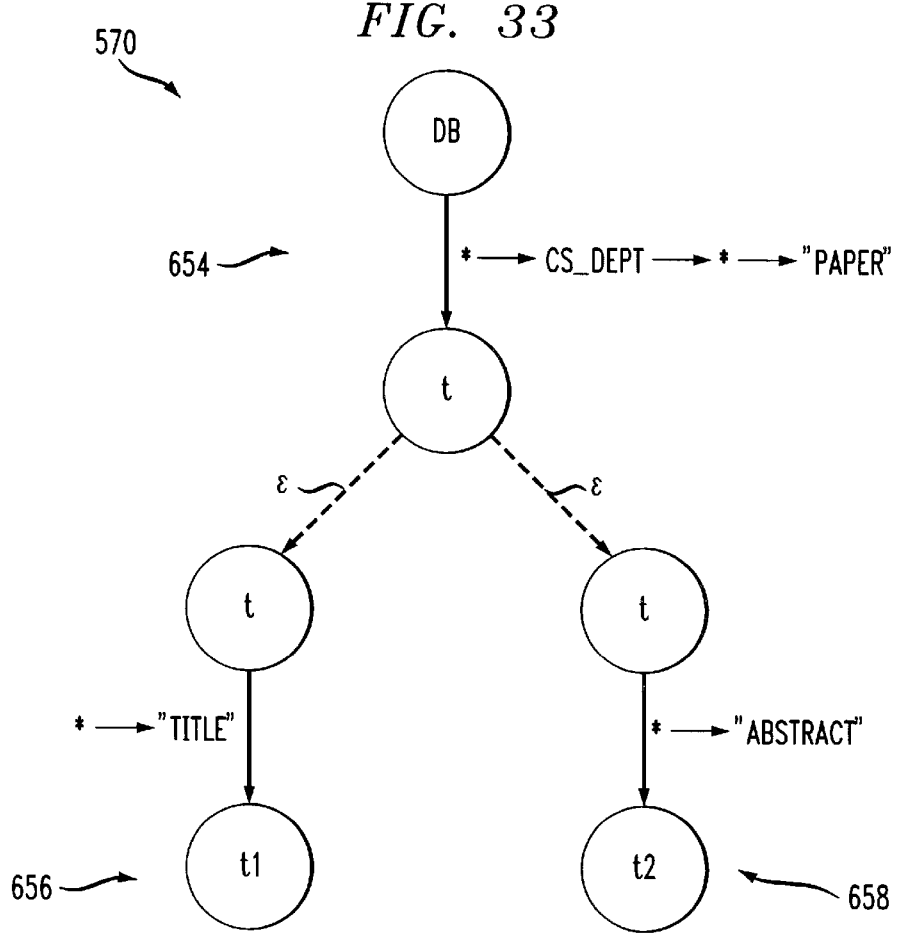
FIG. 33 shows a diagram of a pattern tree corresponding to a selection query.

In a preferred embodiment, the partial result and an enhanced accessibility graph is obtained by constructing a graph of match-set nodes and match nodes based on a pattern tree 570 shown in FIG. 33. The pattern tree 570 has portions 654, 656 and 658 that correspond to the Where clauses of the selection query (5). The portion 654 corresponds to the pattern that results in a subtree t and the portions 656 and 658 correspond to the patterns that are matched on the subtree t to obtain the subtrees $t_1$ and $t_2$, respectively.

Figure 34:
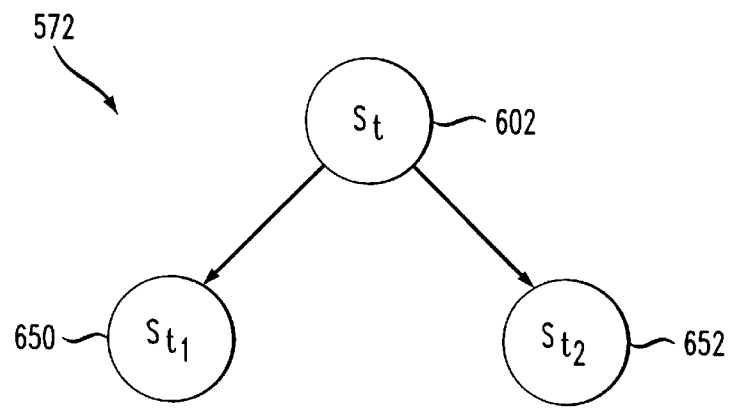
FIG. 34 shows a graph of matched-set nodes corresponding to the pattern tree of FIG. 33.
Figure 35:
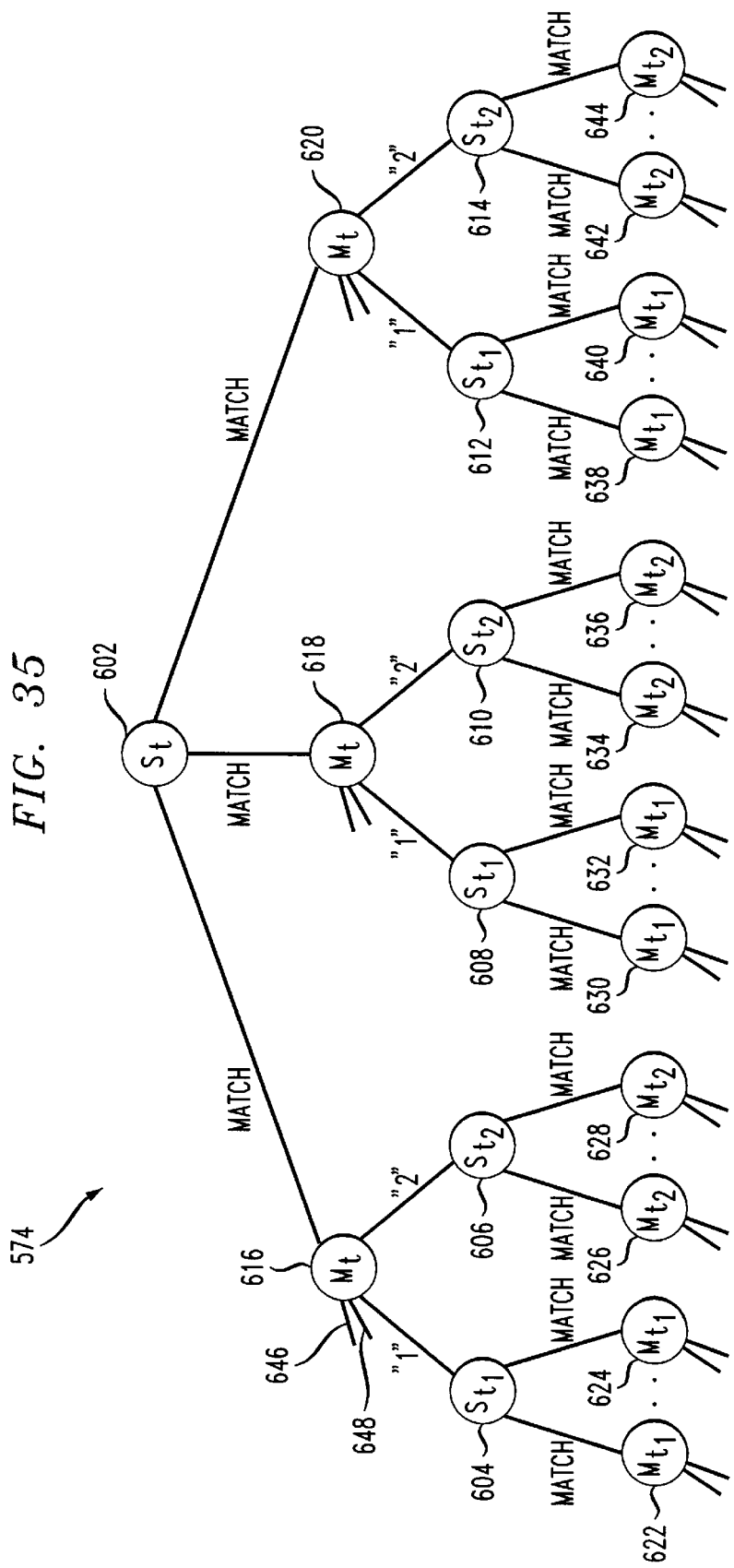
FIG. 35 shows the graph of FIG. 34 enhanced with match nodes in between levels of the match-set nodes.

The pattern tree 570 may be represented by match-set nodes where each match-set node corresponds to one of the portions 654, 656 and 658 of the pattern tree 570 as shown in FIG. 34. In FIG. 34, match-set nodes 602, 650 and 652 corresponding to each portion of the pattern tree 654, 656 and 658, respectively are connected to form a graph 572. The graph 572 is used to collect results of the selection query (5) as the selection query is evaluated on each of the distributed portions of the edge-labeled tree representing the distributed database. The graph 572 is further enhanced with match nodes as the query is being evaluated on each of the distributed portions, as shown by graphs 574 in FIG. 35.

The graph 574 includes match-set nodes 602–614 as well as match nodes 616–644. The match nodes 616, 618 and 620 indicate that the Where clause corresponding to the pattern tree portion 654 has been matched (or found) three times in the edge-labeled tree representing the distributed database.

The "matched" data corresponding to each of the match nodes 616, 618 and 620 is recorded by adding edges such as edges 646 and 648 corresponding to each of the match nodes. In addition, two edges emanate from each of the match nodes 616, 618 and 620 which terminates at match-set nodes 604–614. This represents the query requirement that the Where clause patterns corresponding to the match-set nodes 650 and 652 of the graph 572 must be evaluated on the subtrees of each of the matches represented by the match nodes 616–620. The edge corresponding to match-set node $S_{t1}$ is labeled "1" and the edge corresponding to match-set node $S_{t2}$ is labeled "2" because the match-set nodes $S_{t1}$ and match $S_{t2}$ correspond to the two inner Where clauses of the selection query (5). Each of the match nodes 622–644 also has emanating edges that contain the actual matched data or an identification of the subtree resulting from the match.

Each of the sites of the distributed database may have any portion of the graph 574 depending on the data contained within each of the portions of the distributed database. The graph 574 is further enhanced to include additional nodes for determining existence of a query result and those parts of the distributed portions of the database that contribute to the query result. After constructing the complete graph or a portion of the enhanced graph, each of the terminals 104, 106, 108 sends respective enhanced graphs to the client terminal (which may be one of the terminals 104, 106, 108) which then constructs the enhanced graph for the whole distributed database. Based on the information in this enhanced graph, the client terminal returns information to each of the terminals of the distributed sites to identify those match nodes 616–644 whose data contribute to the overall query result so that each of the terminals 106, 108 may return the data associated with each of the identified match nodes to the client terminal for evaluating the select clause to obtain the query result.

Figure 36A:
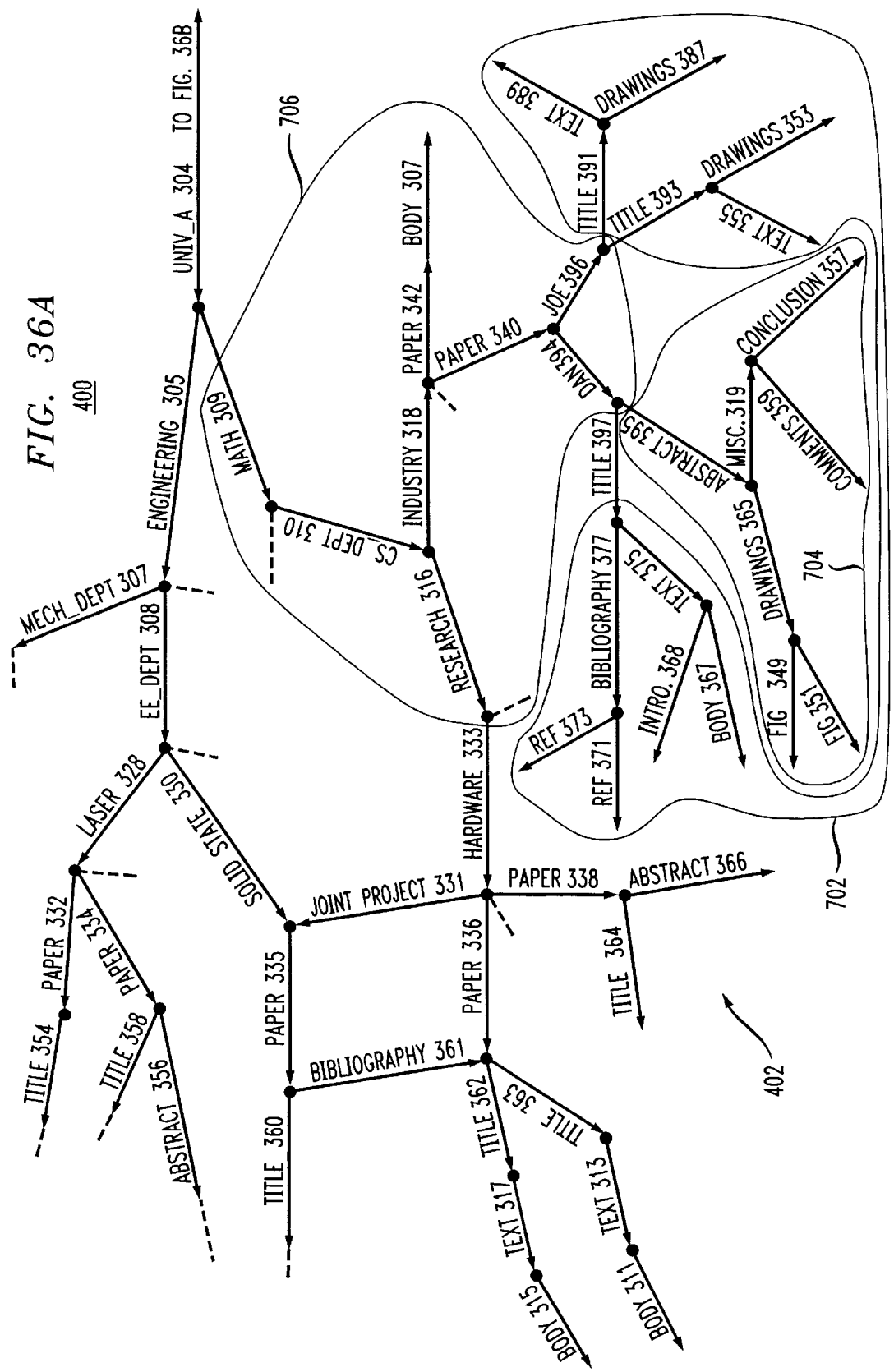
FIGS. 36A and 36B show a portion of the edge-labeled tree of FIG. 3 distributed among three sites.
Figure 36B:
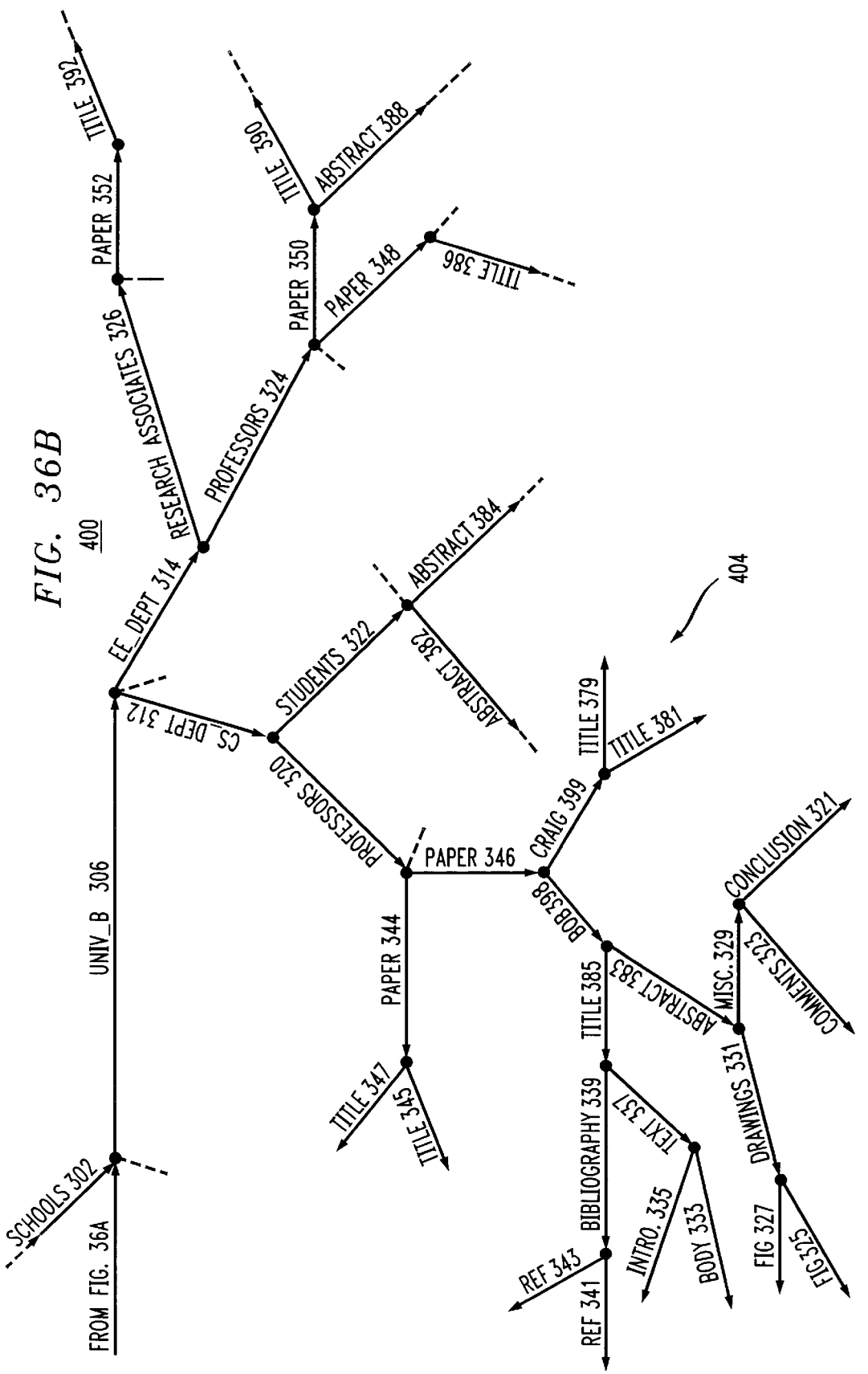
Figure 37:
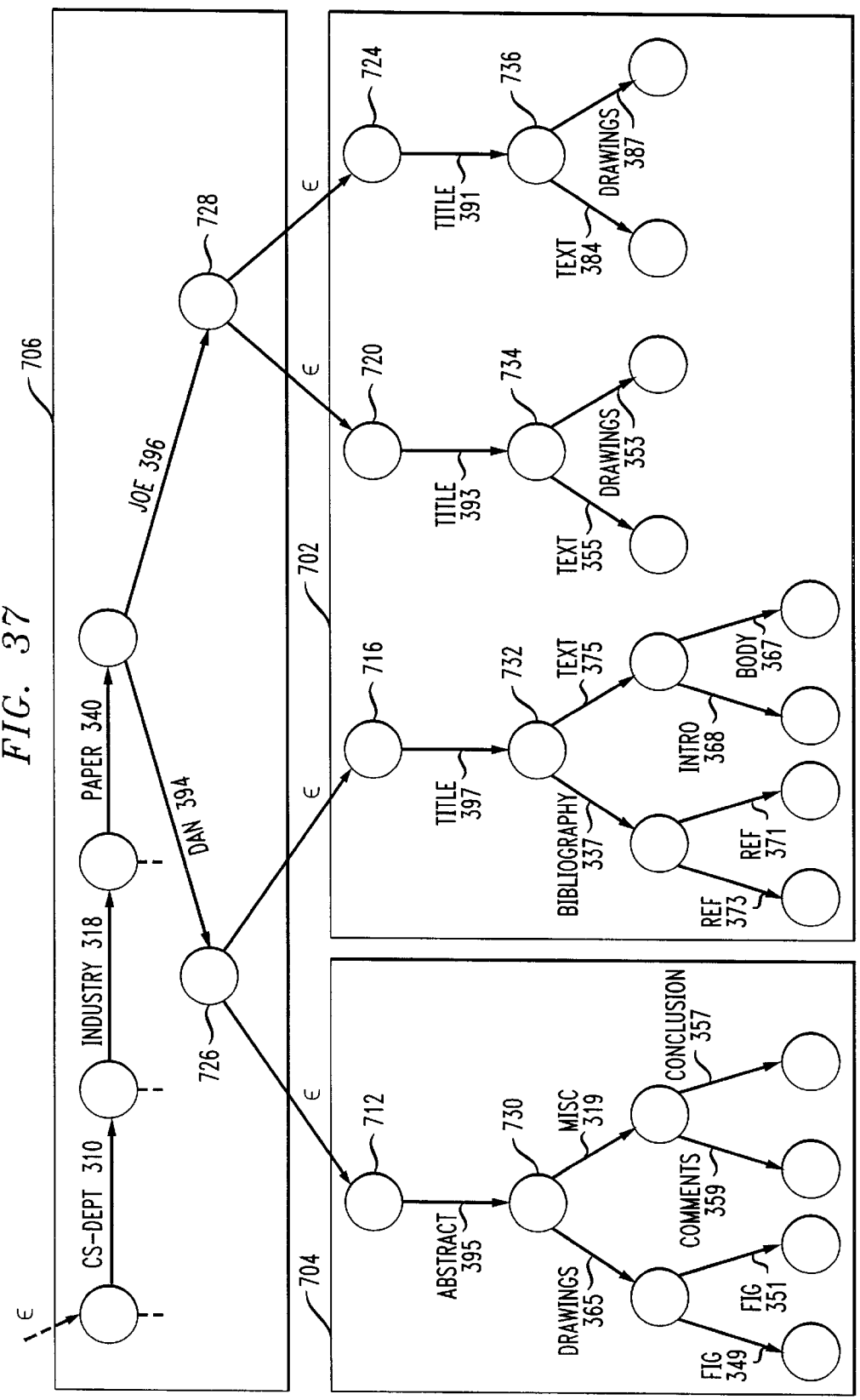
FIG. 37 shows the portion of the edge-labeled tree enhanced with input and output nodes connected by ∈ edges.

As an example, a portion of the edge-labeled tree shown in FIGS. 3A and 3B is shown to be distributed among three sites 702, 704 and 706, as shown in FIGS. 36A and 36B. As before, input and output nodes are created corresponding to the edges that cross the boundaries between the sites and the input and output nodes are connected by ∈ edges as shown in FIG. 37. To evaluate the selection query (5), each of the terminals 104, 106, 108 corresponding to the sites 702, 706 must evaluate the three Where clauses of the selection query (5) which correspond to the match-set nodes 602, 650 and 652 of the graph 572 shown in FIG. 34.

Figure 38:
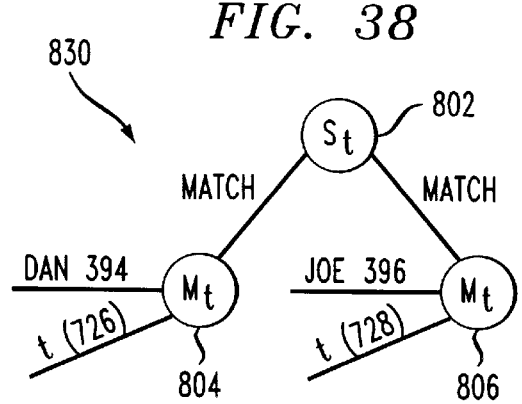
FIGS. 38–42 shows an enhanced matched-set nodes graph corresponding to the edge-labeled tree shown in FIG. 37.

At the site 706, only the pattern corresponding to the match-set nodes 602 has successful matches. Thus, as shown in FIG. 38, match nodes 804 and 806 are created corresponding to the two matches for the edge label Dan 394 and the subtree below the output nodes 726 and the edge label Joe 396 and the subtree below the output node 728. The portion of the edge-labeled tree contained in the site 706 do not contain any other matches corresponding to the match-set nodes 650 and 652. Thus, the graph 830 is the only graph generated by the terminal of the site 706 (the terminal 104, for example).

The graphs 832–838 are generated by the terminals 106, 108 corresponding to the sites 704 and 702 (the terminals 106 and 108, respectively, for example). In site 704, there are no matches corresponding to match-set nodes 602 and 652. However, the edge label Abstract 395 contained in the site 704 matches the pattern for the match-set node 650. Thus, the graph 832 shows match-set node 808 and match node 816. Two edges emanating from match nodes 816 record the edge label Abstract 395 and the subtree (or identity of the subtree) below the input node 730 corresponding to the subtree $t_2$.

In site 702, there are no matches corresponding to the match-set node 602. However, there are three matches for the match-set node 652 corresponding to the three input nodes 716, 720 and 724. Thus, the graphs 834, 836 and 838 have match nodes 818, 820 and 822 corresponding to matches of Title 397 and the subtree below the input node 732 for $t_1$; Title 393 and the subtree $t_1$ below the input node 734; and Title 391 and the subtree $t_1$ below the input node 736.

While the graphs 830–838 indicate all the matches, each of the sites 702–706 cannot determine by its local data whether the matches discovered in the respective portions of the edge-labeled tree contribute to the final query result, because the Select clause of the selection query (5) specify additional requirements beyond the patterns of the Where clauses. For example, the Select clause require both $t_1$ and $t_2$ to be found for each subtree t in order for the respective matches to contribute to the query result. Thus, each of the sites 702–706 must generate additional information beyond the graphs 830–838 in order for the client terminal to determine whether the discovered matches contribute to the final query result.

Figure 43:
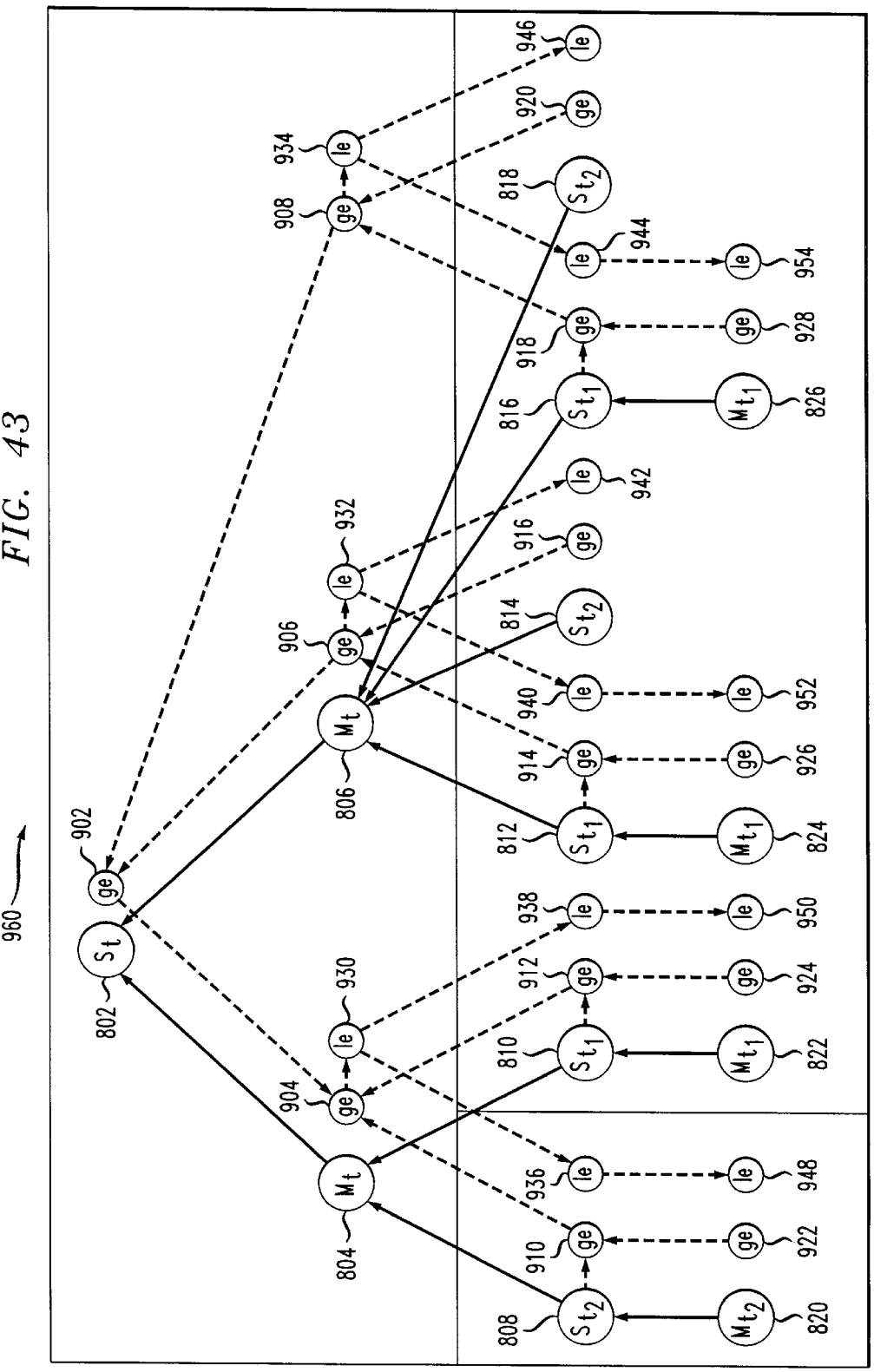
FIG. 43 shows the enhanced matched-set node graph of FIGS. 38–42 further enhanced with global and local existence nodes.

For example, FIG. 43 shows all the graphs 830–832 pieced together into a single graph 960 at the client terminal. From FIG. 43, is it easily determined that the match-set nodes 808 and 810 below the match node 804 have discover matches that satisfy the Select clause of the selection query (5) because both subtree $t_1$ corresponding to edge label Title and subtree $t_2$ corresponding to edge label Abstract are discovered. In contrast, the match-set nodes 812–818 below the match node 806 only discovered subtrees $t_1$ corresponding to the Title edge label and no matches were discovered that corresponds to the Abstract edge label. Thus, the subtrees associated with the match nodes 820 and 822 contributed to the final query result while the match nodes 824 and 826 do not contribute to the final query result.

In order to achieve the above observations at the client terminal, the terminals 104, 106, 108 corresponding to each of the distributed sites 702–706, may generate additional information to assist the client terminal to determine which of the matched results contribute to the final query result. As shown in FIG. 43, local existence nodes (le) 930–954 and global existence nodes (ge) 902–928 are added to the match-set and match nodes 802–826. The le 930–954 can be generated locally to assist the client terminal.

Figure 39:
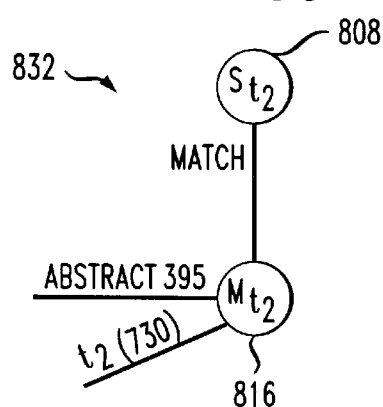
Figure 40:
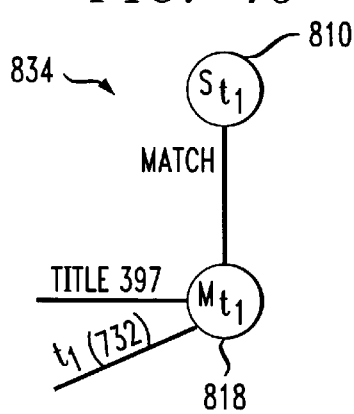
Figure 41:
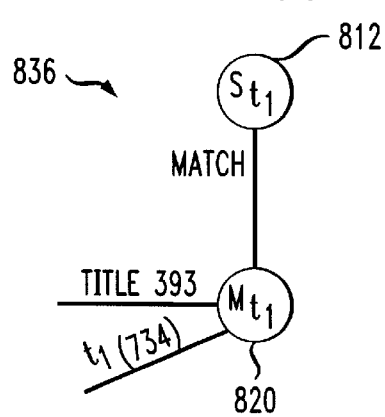
Figure 42:
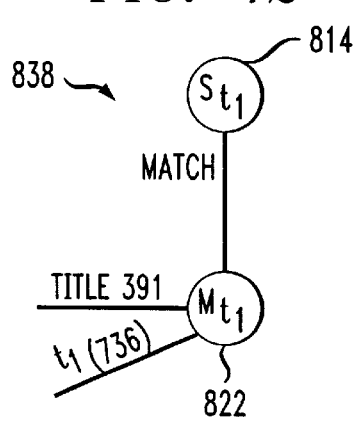

The graph 960 is a directed graph where the edges have a direction. As shown in FIG. 43, the edges connecting the match-set nodes and match nodes have a direction that is opposite from the direction indicated in FIG. 38 and FIG. 39. The edges in the graph 960 indicate a dependency for accessibility. For example, the match-set node 802 is always accessible because it is the root node and is assigned a value of ACC. Thus, the accessiblity of the match and match-set nodes 804–826 below the match-set node 802 depends on the accessibility of the match-set node 802. The accessibility of match node 804 depends directly on the accessibility of match-set node 802; the accessibility of match-set node 808 depends on the accessibility of match node 804; and the accessibility of match node 820 depends on the accessibility of match-set node 808. Based on the above, if match node 804 is not accessibile (i.e., NOT-ACC, cannot be reached or does not exist), then the match-set node 808 is also not accessible even though the match-set node 808 exists and the match node 820 exists. For the example shown in FIG. 43, the terminal 106 at site 704 can only determine the existence of the match-set node 808 and the match node 820, but cannot determine the accessibility of the above nodes. Only the client terminal can determine the accessibility of the match-set node 808 and the match node 820 by combining the graphs from all the sites 702–706 to generate the accessibility graph 960.

The global existence nodes ge 902–928 and the local existence nodes le 939–954 indicate the accessibility of corresponding match-set nodes 802 and 808–818 and match nodes 804, 806 and 820–826 from top-down and bottom-up perspectives, respectively. The local existence nodes 948, 950, 952 and 954 correspond to the leaf match nodes 820, 822, 824 and 828. These local existence nodes 948–954 are always accessible (ACC) because the match nodes 820–828 are found to exist in the respective sites. The local existence nodes 938–946 correspond to match-set nodes 808–818. The local existence nodes 936–946 are "OR" nodes because these nodes take on the logical OR value of all the local existence nodes from the lower level. That is, local existence node 936 is accessible if any of the local existence node(s) below it are accessible such as local existence node 948. If multiple Abstract edges were found below the input node 712 shown in FIG. 37, then multiple match nodes would exist below the match-set node 808 and additional local existence nodes would correspond to each of the additional match nodes. In this case, the local existence node 936 would be the OR of all the local existence nodes corresponding to each of the match nodes below the match-set node 808. In the case shown in FIG. 43, the local existence node 934 is accessible because the local existence node 942 is accessible. Similar reasoning may be applied to the local existence nodes 938–946. Thus, the local existence nodes 936–946 are accessible because the local existence nodes 948–954 are accessible.

The local existence nodes 930–934 are "AND" nodes because both subtree $t_1$ and subtree $t_2$ must be found to satisfy the Select clause of the selection query (5). This implies that the local existence nodes corresponding to match-set node $S_{t1}$ and match-set node $S_{t2}$ must both be accessible. For example, the local existence node 930 has two child local existence nodes 936 and 938. As discussed earlier, both the local existence nodes 936 and 938 are accessible, thus the local existence node 930 is also accessible.

In contrast, to local existence 930, the local existence nodes 932 and 934 are not accessible (NOT-ACC) because while the local existence nodes 940 and 944 corresponding to match-set nodes 812 and 816 are accessible, the local existence nodes 942 and 946 corresponding to match-set nodes 814 and 818 are not accessible because no matches were found for the subtree $t_2$. Thus, the local existence nodes 932 and 934 are not accessible because these local existence nodes are ANDs of the local existence nodes 940, 942 and 944, 946, respectively. In summary, the local existence node 930 is accessible while the local existence nodes 932 and 934 are not accessible.

In order to make the evaluation discussed above, the terminals 106, 108 corresponding to each of the sites 702–706 searches for match nodes corresponding to the match-set nodes for the query (5) and generate the accessibility graphs that include the match-set nodes, match nodes, and the local existence nodes corresponding to each of the match-set nodes and the match nodes. All the terminals 106, 108 transmit their respective accessibility graphs to the client terminal which constructs a complete accessibility graph 960 for the distributed database based on the values of the local existence nodes by evaluating the values of global existence nodes 902–928.

The global existence nodes 902–928 are all OR nodes. The values of the global existence nodes 904–908 is acquired from the local existence nodes 930–934 at the level corresponding to the highest level match nodes 804 and 806, for example. Thus, the global existence nodes 910 and 912 take on the value of the global existence node 904; the global existence node 914 and 916 take on the value of global existence 906; and the global existence nodes 918 and 920 taken on the value of global existence node 908. The global existence node 904 taken on the value of the local existence node 930; the global existence node 906 take on the value of the local existence node 932; and the global existence node 908 take on the value of the local existence node 934 as indicated by the arrows between the global existence nodes and the local existence nodes 904, 930; 906, 932; and 908, 934. Thus, the global existence nodes 904, 906 and 908 are accessible if and only if local existence nodes 930, 932 and 934 are accessible. In addition, the global existence node 902 is the OR of the global existence nodes 904, 906 and 908. Thus, a query result may exist if the global existence node 902 is accessible.

The global existence nodes as described above, propogate the information of whether the necessary matches have been discovered among all the distributed sites that satisfies the Select clause of the selection query (5). Thus, because the selection query (5) requires that both $t_1$ and $t_2$ exists in order for these respective portions to contribute to the query result, the global existence nodes 904, 906 and 908 are only accessible if the corresponding local existence node 930, 932 and 934 are accessible since these local existence nodes contain the information of whether both the subtrees $t_1$ and $t_2$ have been found. If each of the local existence nodes 930, 932 and 934 individually is accessible, then the subtrees $t_1$ and $t_2$ discovered in each of the respective sites do contribute to the query result and should be forwarded to the client terminal. However, if each of the local existence nodes 930, 932 and 934 individually is not accessible, then the discover subtrees $t_1$ or $t_2$ do not contribute to the query result. Based on the above, the subtrees corresponding to the match nodes 820 and 822 contribute to the query result while the subtrees corresponding to match nodes 824 and 826 do not contribute to the query result.

Finally, the accessibility of the match-set nodes 808–818 is determined by ANDing the value of the global existence nodes 910–920 with the accessibility of the match nodes 804 and 806. Thus, the matched-set node 808 is accessible if and only if both the match node 804 and the global existence node 910 are accessible. It is insufficient for the matched-set node 808 to be accessible through the matched node 804. The accessibility of the matched-set node 808 depends on the accessibility of all the nodes required by the Selection clause represented by the global existence node 910. However, even if the global existence node 900 is accessible, if the match-set node 808 is not along a path that is connected to the match-set node 802, then not all the selection query patterns are satisfied. Thus, in this case, the match-set node 808 would not be accessible even if the global existence node 910 is accessible. As discussed above, the accessibility of the match nodes 820–826 depends on the accessibility of the match-set nodes 808, 810; 812 and 816. Thus, if any of the match-set nodes 808, 810, 812 and 816 are not accessible, then the respected match nodes 820–826 are also not accessible even if the corresponding global existence nodes 922–928 are accessible.

For example, if the match node 804 did not exist because the Dan 394 edge is missing, then the label variable x must bind to the edge label Abstract 395. However, because site 706 does not include Abstract 395, the match node 804 cannot be generated. Even if Abstract 395 was included in the site 706, the Abstract edge label would bind to the label variable x and thus would not be available to match the "Abstract" pattern.

The query evaluation at site 704 is the same as before. However, the match-set node 808 is not accessible because the match node 804 does not exist and is thus not accessible. Thus, there is no path from the match-set node 808 to the match-set node 802. Accordingly, the match-set node 808 and the match node 820 are not accessible.

The client terminal assembles the graph 960 based on the input from the terminals 104, 106, 108 of all the distributed portions and determines the accessibility of each of the leaf matched nodes 820–826. Only those subtrees corresponding to accessible leaf match nodes 820–826 are identified by the client terminal to the respective terminals 106, 108 of the distributed portions for return to the client terminal evaluating the selection clause to construct the query result. The above evaluation of the selection query (5) across a distributed database across multiple sites are efficient because the total number of communication steps among the terminals is independent of the content of the distributed database and the total amount of data transferred among the terminals depends only on the total number of interrelationships of the database portions and the size of the evaluation result.

While this invention has been described in conjunction with specific embodiments thereof, it is evident that many alternatives, modification, and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A method for generating a final result of a query of a database that is represented by an edge-labeled tree and decomposed into a plurality of separated portions, comprising:

evaluating the query for each of the separated portions;

generating accessibility graphs for the separated portions based on respective query evaluations, each of the accessibility graphs corresponding to one of the separated portions;

combining the accessibility graphs into a single graph;

identifying parts of the separated portions that contribute to the final query result based on the single graph; and generating the final query result based on identified parts of the separated portions.

2. The method of claim 1, further comprising identifying input and output nodes corresponding to cross links, wherein cross links are edges of the edge-labeled tree that cross between two of the separated portions, the output nodes being associated with separated portions from which the cross links emanate and the input nodes being associated with separated portions to which the cross links terminate.

3. The method of claim 2, wherein the evaluating step comprises:

resolving the query into a plurality of match patterns, the match patterns having an order relationship with each other based on the query;

forming groups of match patterns, each of the groups beginning with one of the match patterns and ending with an ending match pattern based on the order of relationships, the ending match pattern preceding a subtree which may contribute to the final query result; and matching each of the groups of match patterns with patterns of edges of a separated portion of the separated portions beginning with each of input nodes of the separated portion and ending at either output nodes or leaf nodes of the separated portion.

4. The method of claim 3, wherein the generating accessibility graph step comprises:

generating at least one of at least one first accessibility node corresponding to all pairs of ones of the input nodes of the separated portion and ones of the groups of matching patterns, and at least one second accessibility node corresponding to all pairs of ones of the output nodes of the separated portion and one of the groups of matching patterns;

generating at least one of at least one third accessibility node corresponding to all input nodes of the separated portion and at least one fourth accessibility node corresponding to all output nodes of the separated portion; and connecting the first and third accessibility nodes to the second and the fourth accessibility nodes with at least one directed graph edge based on results of the matching step.

5. The method of claim 4, wherein the combining step comprises connecting first, second, third, and fourth accessibility nodes of each of the accessibility graphs to first, second, third and fourth accessibility nodes of accessibility graphs of other separated portions based on the cross links of corresponding input nodes and corresponding output nodes to form the single graph.

6. The method of claim 5, wherein the identifying step comprises:

tracing directed edges of the single graph to locate accessibility nodes that are associated with the final query result; and identifying parts of the separated portion associated with located accessibility nodes as the parts that contribute to the final result.

7. The method of claim 6, wherein the generating the final query result step comprises:

retrieving edge labels and subtrees of the parts that contribute to the final query result; and forming the query result based on the edge labels and subtrees of the identified separated portions.

8. The method of claim 3, wherein the match patterns correspond to a plurality of match-set nodes, the match-set nodes being formed into a match-set node graph of connected match-set nodes based on the query, starting with an empty accessibility graph, the generating accessibility graphs step comprising:

matching match patterns corresponding to first match-set nodes of the match-set node graph with patterns of edges of each of the separated portions;

adding to the accessibility graph a first matched match-set node if corresponding match patterns of the first match-set node is found and adding one first match node for each match connected below the first matched match-set node;

matching match patterns corresponding to second match-set nodes that appear below the first matched match-set node in the match-set node graph, if a match is found for any of the second match-set nodes, then adding to the accessibility graph second matched match-set nodes connected below the first matched match-set node and for each match, adding one second match node connected below the second matched match-set node; and generating at least a data edge emanating from each of the match nodes labeled by at least one of a variable of a respective corresponding match pattern and an identification of a part of each of the separated portions identified by the respective corresponding match pattern.

9. The method of claim 8, further comprising:

adding to the accessibility graph local existence nodes corresponding to each of the match-set nodes and match nodes and connecting the local existence nodes in a similar manner as the match-set nodes and the match nodes are connected;

setting the values of each of the local existence nodes corresponding to leaf match nodes to ACC;

setting values of each of the local existence nodes corresponding to other match nodes to ACC if values of the local existence nodes below each of the local existence nodes are all ACC; and setting values of each of the local existence nodes corresponding to match-set nodes to ACC if any values of local existence nodes below each of the local existence nodes is ACC.

10. The method of claim 9, wherein the combining step comprises:
connecting all accessibility graphs corresponding to each of the separated portions based on the match-set node graph, wherein a connection is not made if a match node associated with an input node does not correspond to a match-set node associated with a corresponding output node, and if a match-set node associated with an input node does correspond to a match node associated with a corresponding output node.

11. The method of claim 10, further comprising:
adding global existence nodes to the accessibility graph corresponding to each of the match-set and match nodes of the accessibility graph and connecting the global existence nodes in the similar manner as the match-set and match nodes;
setting a value of a first global existence node to the value of a corresponding local existence node that corresponds to a match node a match pattern corresponding to a highest level match-set node;
setting a value of a second global existence node corresponding to the highest level match-set node to the value of ACC if any of the first global existence node has a value of ACC;
setting values of all other global existence nodes to values of global existence nodes of a next higher level in the accessibility graph if a next higher level exists and setting values to NOT-ACC if the next higher level does not exists and the other global existence nodes does not correspond to the highest level match-set node;
assigning an ACC value to a match-set node of the match-set nodes if the match-set node is connected to the highest level match-set node in the accessibility graph and if the corresponding global existence node has a value of ACC, otherwise assigning a NOT-ACC value to the match-set node; and
assigning an ACC value to a match node or a match-set node that is connected below a match-set node or a match node, respectively that is assigned a value of ACC.

12. The method of claim 11, wherein the generating the final query step comprises:
identifying leaf match nodes of the accessibility graph having an assigned value of ACC and whose corresponding global existence nodes have values of ACC;
identifying result match nodes which are all match nodes along a path from the highest level match-set node to identified leaf match nodes;
collecting parts of separated portions stored or identified by data edges of result match nodes; and
selecting from the collected parts to form the final query result.

13. A system operating in a network that generates a final result of a query of a database that is represented by an edge-labeled tree and decomposed into a plurality of separated portions, comprising:
a plurality of terminals coupled to the network, each of the terminals having immediate access to one of the separated portions;
a client terminal coupled to the terminals through the network, wherein the terminals evaluate the query for each of respective separated portions, and generate accessibility graphs for each of the separated portions based on respective query evaluations, the client terminal combining the accessibility graphs into a single graph, identifying parts of the separated portions that contribute to the final query result based on the single graph, and generating the final query result based on identified parts of the separated portions.

14. The system of claim 13, further comprising identifying input and output nodes corresponding to cross links, wherein cross links are edges of the edge-labeled tree that cross between two of the separated portions, the output nodes being associated with separated portions from which the cross links emanate and the input nodes being associated with separated portions to which the cross links terminate.

15. The system of claim 14, wherein the query is resolved into a plurality of match patterns, the match patterns having an order relationship with each other based on the query, groups of match patterns being formed, each of the groups beginning with one of the match patterns and ending with an ending match pattern based on the order of relationships, the ending match pattern preceding a subtree which may contribute to the final query result, each of the groups of match patterns being matched with patterns of edges of a separated portion of the separated portions beginning with each of input nodes of the separated portion and ending at either output nodes or leaf nodes of the separated portion to generate match results.

16. The system of claim 15, wherein each of the terminals generates at least one of at least one first accessibility node corresponding to all pairs of ones of the input nodes of the respective separated portion and ones of the groups of matching patterns, and at least one second accessibility node corresponding to all pairs of ones of the output nodes of the separated portion and one of the groups of matching patterns, generate at least one of at least one third accessibility node corresponding to all input nodes of the separated portion and at least one fourth accessibility node corresponding to all output nodes of the separated portion, and connected the first and third accessibility nodes to the second and the fourth accessibility nodes with at least one directed graph edge based on the match results.

17. The system of claim 16, wherein the client terminal connects first, second, third, and fourth accessibility nodes of each of the accessibility graphs to first, second, third and fourth accessibility nodes of accessibility graphs of other separated portions based on the cross links of corresponding input nodes and corresponding output nodes to form the single graph.

18. The system of claim 17, wherein the client terminal traces directed edges of the single graph to locate accessibility nodes that are associated with the final query result, and identifies parts of the separated portion associated with located accessibility nodes as the parts that contribute to the final result.

19. The system of claim 18, wherein the client terminal retrieves edge labels and subtrees of the parts that contribute to the final query result, and forms the query result based on the edge labels and subtrees of the identified separated portions.

20. The system of claim 15, wherein the match patterns correspond to a plurality of match-set nodes, the match-set nodes being formed into a match-set node graph of connected match-set nodes based on the query, starting with an empty accessibility graph, the terminals:
1) matching match patterns corresponding to first match-set nodes of the match-set node graph with patterns of edges of each of the separated portions, 2) adding to the accessibility graph a first matched match-set node if corresponding match patterns of the first match-set node is found and adding one first match node for each match connected below the first matched match-set node, 3) matching match patterns corresponding to second match-set nodes that appear below the first matched match-set node in the match-set node graph, if a match is found for any of the second match-set nodes, then adding to the accessibility graph second matched match-set nodes connected below the first matched match-set node and for each match, adding one second match node connected below the second matched match-set node, and 4) generating at least a data edge emanating from each of the match nodes labeled by at least one of a variable of a respective corresponding match pattern and an identification of a part of each of the separated portions identified by the respective corresponding match pattern.

21. The system of claim 20, wherein the terminals add to the accessibility graph local existence nodes corresponding to each of the match-set nodes and match nodes and connecting the local existence nodes in a similar manner as the match-set nodes and the match nodes are connected, set the values of each of the local existence nodes corresponding to leaf match nodes to ACC, set values of each of the local existence nodes corresponding to other match nodes to ACC if values of the local existence nodes below each of the local existence nodes are all ACC, and set values of each of the local existence nodes corresponding to match-set nodes to ACC if any values of local existence nodes below each of the local existence nodes is ACC.

22. The method of claim 21, wherein the client terminal connects all accessibility graphs corresponding to each of the separated portions based on the match-set node graph, a connection being not made if a match node associated with an input node does not correspond to a match-set node associated with a corresponding output node, and if a match-set node associated with an input node does correspond to a match node associated with a corresponding output node.

23. The system of claim 22, wherein the client terminal adds global existence nodes to the accessibility graph corresponding to each of the match-set and match nodes of the accessibility graph, connects the global existence nodes in the similar manner as the match-set and match nodes, sets a value of a first global existence node to the value of a corresponding local existence node that corresponds to a match node a match pattern corresponding to a highest level match-set node, sets a value of a second global existence node corresponding to the highest level match-set node to the value of ACC if any of the first global existence node has a value of ACC, sets values of all other global existence nodes to values of global existence nodes of a next higher level in the accessibility graph if a next higher level exists and setting values to NOT-ACC if the next higher level does not exists and the other global existence nodes does not correspond to the highest level match-set node, assigns an ACC value to a match-set node of the match-set nodes if the match-set node is connected to the highest level match-set node in the accessibility graph and if the corresponding global existence node has a value of ACC, otherwise assigning a NOT-ACC value to the match-set node, and assigns an ACC value to a match node or a match-set node that is connected below a match-set node or a match node, respectively that is assigned a value of ACC.

24. The system of claim 23, wherein the client terminal identifies leaf match nodes of the accessibility graph having an assigned value of ACC and whose corresponding global existence nodes have values of ACC, identifies result match nodes which are all match nodes along a path from the highest level match-set node to identified leaf match nodes, collects parts of separated portions stored or identified by data edges of result match nodes, and selects from the collected parts to form the final query result.

* * * * *